United States Patent
Kim et al.

(10) Patent No.: US 11,248,833 B2
(45) Date of Patent: Feb. 15, 2022

(54) VACUUM ADIABATIC BODY AND REFRIGERATOR

(71) Applicant: LG ELECTRONICS INC., Seoul (KR)

(72) Inventors: Daewoong Kim, Seoul (KR); Bongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/766,233

(22) PCT Filed: Dec. 11, 2018

(86) PCT No.: PCT/KR2018/015706
§ 371 (c)(1),
(2) Date: May 21, 2020

(87) PCT Pub. No.: WO2019/117598
PCT Pub. Date: Jun. 20, 2019

(65) Prior Publication Data
US 2020/0370819 A1    Nov. 26, 2020

(30) Foreign Application Priority Data

Dec. 13, 2017  (KR) .................. 10-2017-0171596

(51) Int. Cl.
*F25D 23/06*   (2006.01)
(52) U.S. Cl.
CPC ........ *F25D 23/062* (2013.01); *F25D 2201/14* (2013.01)

(58) Field of Classification Search
CPC ...... F25D 23/06; F25D 23/062; F25D 23/063; F25D 23/006; F25D 2201/14
See application file for complete search history.

(56) References Cited

U.S. PATENT DOCUMENTS

| 2,000,882 A | 5/1935 | Comstock |
| 2,464,526 A | 3/1949 | Palmer |
| 2,989,156 A | 6/1961 | Brooks et al. |
| 3,936,553 A | 2/1976 | Rowe |

(Continued)

FOREIGN PATENT DOCUMENTS

| CN | 1420331 | 5/2003 |
| CN | 1603728 | 4/2005 |

(Continued)

OTHER PUBLICATIONS

International Search Report dated Mar. 20, 2019 issued in Application No. PCT/KR2018/015703.

(Continued)

*Primary Examiner* — Daniel J Rohrhoff
(74) *Attorney, Agent, or Firm* — KED & Associates, LLP

(57) ABSTRACT

A vacuum adiabatic body according to the present invention includes at least one reinforcing frame which is installed along a corner of at least one of a first plate member and a second plate member constituting an inner wall and an outer wall of the vacuum adiabatic body and is provided as one body for reinforcing the strength, thereby being capable of reinforcing the strength of the vacuum adiabatic body which is applied to the three-dimensional structure.

20 Claims, 21 Drawing Sheets

(56) References Cited

U.S. PATENT DOCUMENTS

| | | | |
|---|---|---|---|
| 4,632,470 A * | 12/1986 | Jenkins | F25D 23/062 |
| | | | 29/525.12 |
| 4,822,117 A | 4/1989 | Boston, Jr. | |
| 5,011,729 A | 4/1991 | McAllister | |
| 5,485,397 A | 1/1996 | Yamazato | |
| 5,897,181 A | 4/1999 | Avendano et al. | |
| 6,038,830 A | 3/2000 | Hirath et al. | |
| 6,178,763 B1 | 1/2001 | Brancheau et al. | |
| 6,350,002 B1 | 2/2002 | Takaoka et al. | |
| 6,485,122 B2 | 11/2002 | Wolf | |
| 6,725,624 B2 | 4/2004 | Hirath | |
| 7,407,240 B2 * | 8/2008 | Collins | F25D 23/063 |
| | | | 312/406.2 |
| 9,170,046 B2 | 10/2015 | Jung | |
| 9,702,615 B1 * | 7/2017 | Chartrand | A47B 96/14 |
| 10,274,247 B2 | 4/2019 | Jeong et al. | |
| 10,712,080 B2 * | 7/2020 | Westlake | F25D 23/066 |
| 10,753,669 B2 | 8/2020 | Dherde et al. | |
| 10,760,849 B2 | 9/2020 | Jung et al. | |
| 10,837,696 B2 | 11/2020 | Jung et al. | |
| 10,907,887 B2 | 2/2021 | Jung et al. | |
| 10,913,232 B2 | 2/2021 | Dye et al. | |
| 10,941,974 B2 | 3/2021 | Jung et al. | |
| 11,047,616 B2 | 6/2021 | Jeong et al. | |
| 11,079,171 B2 | 8/2021 | Marinello et al. | |
| 2002/0041134 A1 | 4/2002 | Wolf et al. | |
| 2002/0100250 A1 | 8/2002 | Hirath et al. | |
| 2003/0041612 A1 | 3/2003 | Piloni | |
| 2004/0012315 A1 * | 1/2004 | Grace | F25D 23/062 |
| | | | 312/406 |
| 2004/0035142 A1 | 2/2004 | Yoon et al. | |
| 2004/0226956 A1 | 11/2004 | Brooks | |
| 2006/0130513 A1 | 6/2006 | Chang et al. | |
| 2007/0133192 A1 | 6/2007 | Alessandro | |
| 2007/0228907 A1 * | 10/2007 | Luisi | F25D 23/069 |
| | | | 312/404 |
| 2008/0302441 A1 | 12/2008 | Kelly et al. | |
| 2009/0284116 A1 * | 11/2009 | Gorz | F25D 23/062 |
| | | | 312/405 |
| 2010/0252698 A1 | 10/2010 | Dye et al. | |
| 2010/0279055 A1 * | 11/2010 | Song | B32B 27/36 |
| | | | 428/68 |
| 2011/0011106 A1 | 1/2011 | Ahn et al. | |
| 2012/0044131 A1 | 2/2012 | Nussbächer et al. | |
| 2012/0104923 A1 | 5/2012 | Jung et al. | |
| 2012/0125039 A1 * | 5/2012 | Hwang | F16L 59/065 |
| | | | 62/440 |
| 2012/0128420 A1 * | 5/2012 | Schroeder | E01C 23/16 |
| | | | 404/118 |
| 2012/0128920 A1 | 5/2012 | Yoon et al. | |
| 2012/0235551 A1 | 9/2012 | Park et al. | |
| 2013/0105494 A1 | 5/2013 | Jung | |
| 2013/0105495 A1 | 5/2013 | Jung | |
| 2013/0105496 A1 * | 5/2013 | Jung | F25D 23/062 |
| | | | 220/592.05 |
| 2013/0111942 A1 | 5/2013 | Jung | |
| 2014/0369063 A1 | 12/2014 | Kleo et al. | |
| 2015/0030800 A1 | 1/2015 | Jung et al. | |
| 2015/0245720 A1 | 9/2015 | Isfort et al. | |
| 2016/0047592 A1 | 2/2016 | Rolek et al. | |
| 2016/0109172 A1 | 4/2016 | Kim et al. | |
| 2016/0161174 A1 | 6/2016 | Yi et al. | |
| 2016/0220039 A1 | 8/2016 | Chang et al. | |
| 2016/0258671 A1 * | 9/2016 | Allard | F25D 23/085 |
| 2017/0184341 A1 | 6/2017 | Grimm et al. | |
| 2017/0292776 A1 | 10/2017 | Kim | |
| 2017/0336129 A1 | 11/2017 | Cunningham | |
| 2017/0370632 A1 | 12/2017 | Jeong et al. | |
| 2018/0180350 A1 | 6/2018 | Yoon | |
| 2018/0238610 A1 * | 8/2018 | Jung | F25D 23/087 |
| 2019/0120544 A1 | 4/2019 | Deka | |
| 2019/0120547 A1 | 4/2019 | Staud et al. | |
| 2019/0145697 A1 * | 5/2019 | Naik | F25D 23/06 |
| | | | 312/400 |
| 2019/0310011 A1 | 10/2019 | Marinello | |
| 2020/0182393 A1 | 6/2020 | Jung et al. | |
| 2020/0370819 A1 * | 11/2020 | Kim | F25D 23/069 |
| 2021/0108852 A1 * | 4/2021 | Guizoni, Jr. | F25D 23/065 |
| 2021/0140704 A1 | 5/2021 | Kim et al. | |
| 2021/0190255 A1 * | 6/2021 | Allard | F25D 23/085 |

FOREIGN PATENT DOCUMENTS

| | | |
|---|---|---|
| CN | 101995140 | 3/2011 |
| CN | 102679663 | 9/2012 |
| CN | 102829593 | 12/2012 |
| CN | 103090615 | 5/2013 |
| CN | 103189696 | 7/2013 |
| CN | 103471314 | 12/2013 |
| CN | 103733007 | 4/2014 |
| CN | 105393073 | 3/2016 |
| CN | 105627657 | 6/2016 |
| CN | 106052248 | 10/2016 |
| CN | 107110593 | 8/2017 |
| DE | 19745825 | 4/1999 |
| EP | 1338854 | 8/2003 |
| EP | 2 589 904 | 5/2013 |
| EP | 2985551 | 2/2016 |
| EP | 3 193 110 | 7/2017 |
| GB | 890372 | 2/1962 |
| JP | S58-64239 | 4/1983 |
| JP | H04-327779 | 11/1992 |
| JP | 08-303937 | 11/1996 |
| JP | 2004-293913 | 10/2004 |
| JP | 2008-089244 | 4/2008 |
| JP | 2013-002655 | 1/2013 |
| JP | 2014-126219 | 7/2014 |
| KR | 10-0343719 | 7/2002 |
| KR | 10-2006-0071848 | 6/2006 |
| KR | 10-0725790 | 6/2007 |
| KR | 10-2011-0006997 | 1/2011 |
| KR | 10-2015-0012712 | 2/2015 |
| KR | 10-2016-0044842 | 4/2016 |
| KR | 10-1631904 | 6/2016 |
| KR | 10-2017-0016187 | 2/2017 |
| RU | 1781519 | 12/1992 |
| RU | 2 315 925 | 1/2008 |
| RU | 2 468 316 | 11/2012 |
| SU | 1742602 | 6/1992 |
| WO | WO 2006/011112 | 2/2006 |
| WO | WO 2012/050308 | 4/2012 |
| WO | WO 2013/164176 | 11/2013 |
| WO | WO 2014/196609 | 12/2014 |
| WO | WO 2016/105019 | 6/2016 |
| WO | WO 2017/023094 | 2/2017 |
| WO | WO 2017/023095 | 2/2017 |
| WO | WO 2017/080767 | 5/2017 |
| WO | WO 2017/180126 | 10/2017 |

OTHER PUBLICATIONS

Written Opinion dated Mar. 20, 2019 issued in Application No. PCT/KR2018/015703.
International Search Report dated Mar. 20, 2019 issued in Application No. PCT/KR2018/015706.
Written Opinion dated Mar. 20, 2019 issued in Application No. PCT/KR2018/015706.
International Search Report dated Mar. 20, 2019 issued in Application No. PCT/KR2018/015709.
Written Opinion dated dated Mar. 20, 2019 issued in Application No. PCT/KR2018/015709.
International Search Report dated Mar. 20, 2019 issued in Application No. PCTKR2018/015710.
Written Opinion dated Mar. 20, 2019 issued in Application No. PCT/KR2018/015710.
International Search Report dated Mar. 28, 2019 issued in Application No. PCT/KR2018/015713.
Written Opinion dated Mar. 28, 2019 issued in Application No. PCT/KR2018/015713.
Russian Office Action dated May 11, 2021 in RU Application No. 2020122686/10(039013).

(56) References Cited

OTHER PUBLICATIONS

Russian Office Action dated Apr. 20, 2021 issued in RU Application No. 2020122685/10(039012).
Russian Office Action dated Apr. 20, 2021 issued in RU Application No. 2020122682/10(039009).
United States Office Action dated Sep. 28, 2021 issued in co-pending related U.S. Appl. No. 16/766,562.
European Search Report dated Jul. 22, 2021 issued in EP Application No. 18888053.8.
Chinese Office Action dated Aug. 23, 2021 issued in CN Application No. 201880081068.3.
European Search Report dated Aug. 9, 2021 issued in EP Application No. 18889452.1.
Chinese Office Action dated Aug. 20, 2021 issued in CN Application No. 201880080785.4.
European Search Report dated Jul. 29, 2021 issued in Application No. 18889271.5.
Chinese Office Action dated Jul. 28, 2021 issued in Application No. 201880080796.2.
U.S. Office Action dated Oct. 28, 2021 issued in U.S. Appl. No. 16/766,215.
Chinese Office Action dated Aug. 4, 2021 issued in Application No. 201880080831.0.
European Search Report dated Jul. 29, 2021 issued in Application No. 18887635.3.
Chinese Office Action dated Sep. 2, 2021 issued in CN Application No. 201880080793.9.

\* cited by examiner

[Fig. 1]
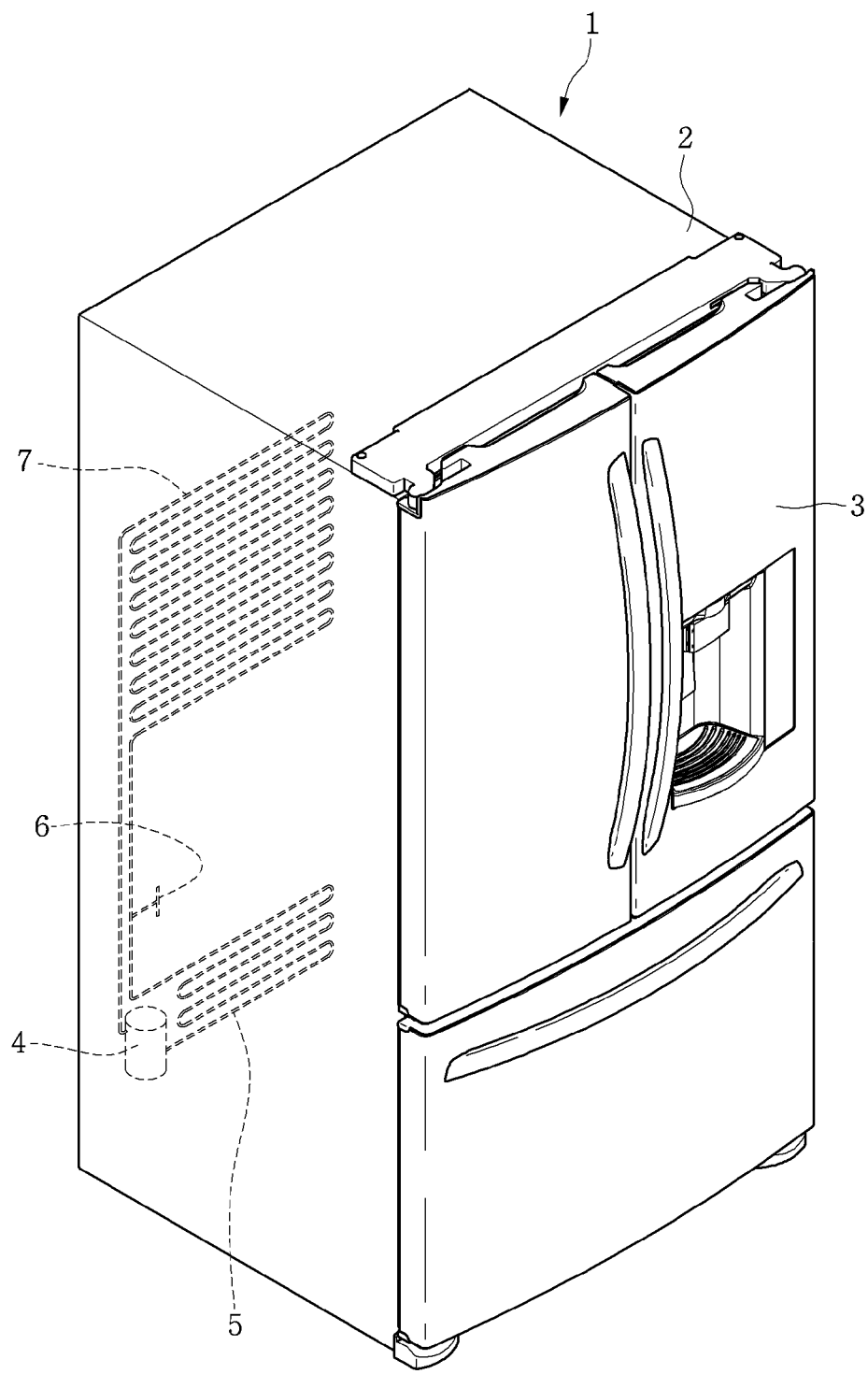

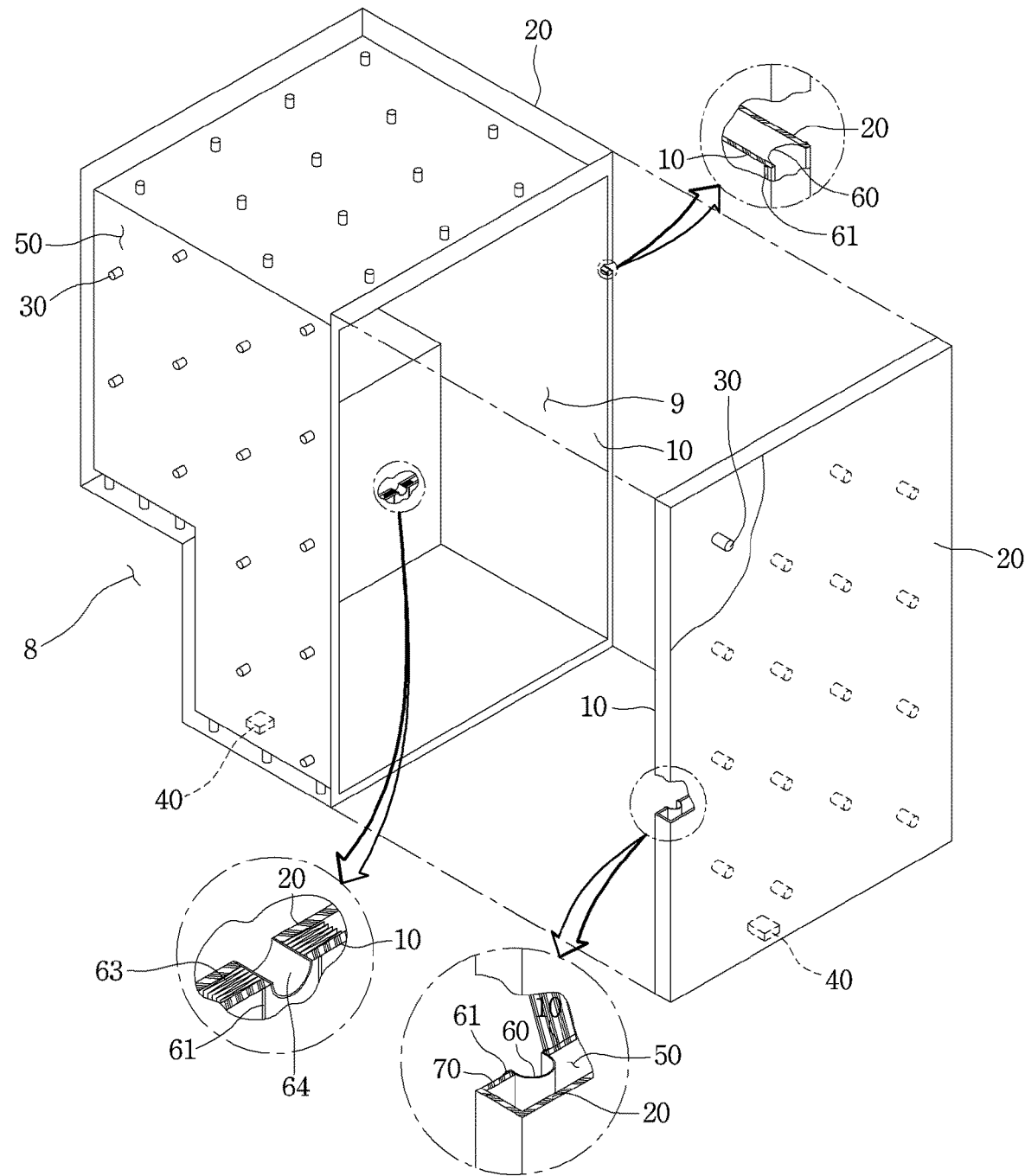
[Fig. 2]

[Fig. 3]
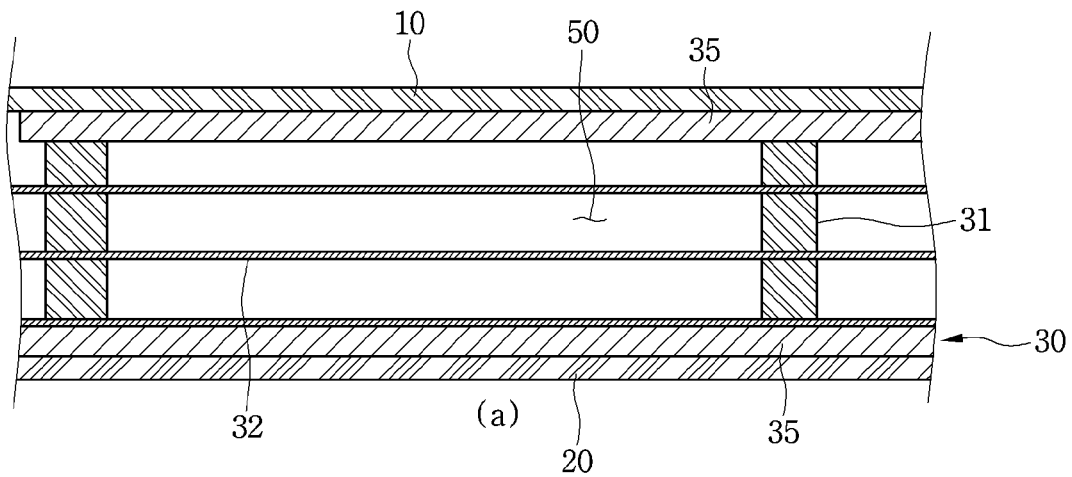
(a)
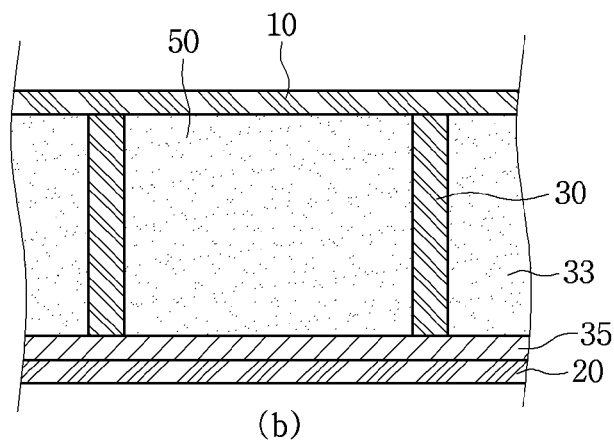
(b)
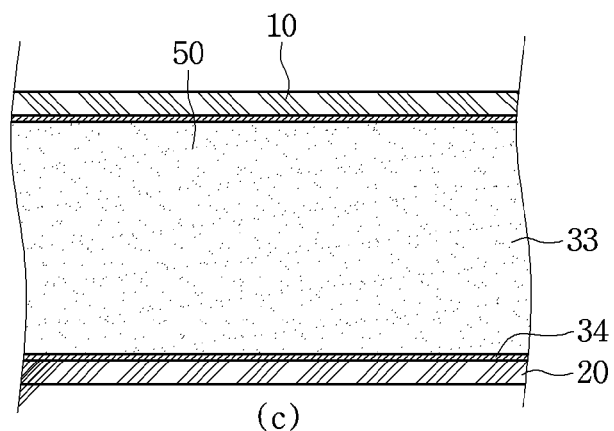
(c)

[Fig. 4]
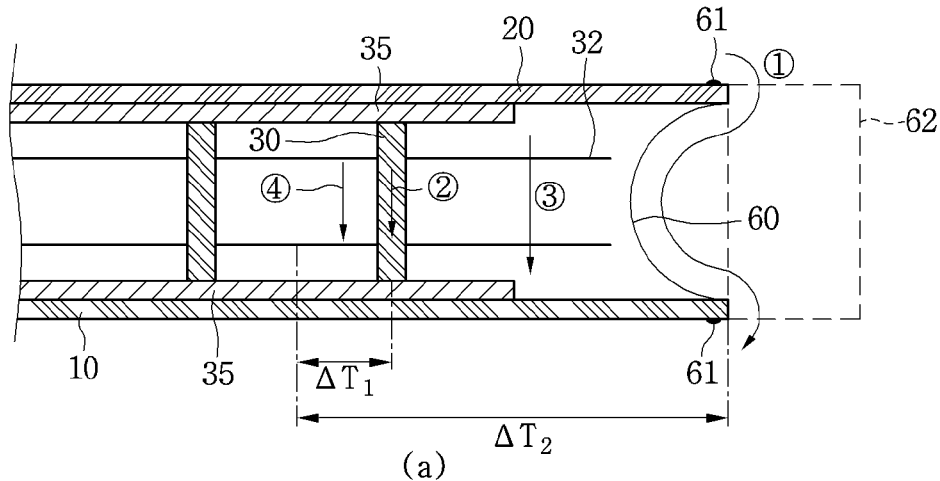
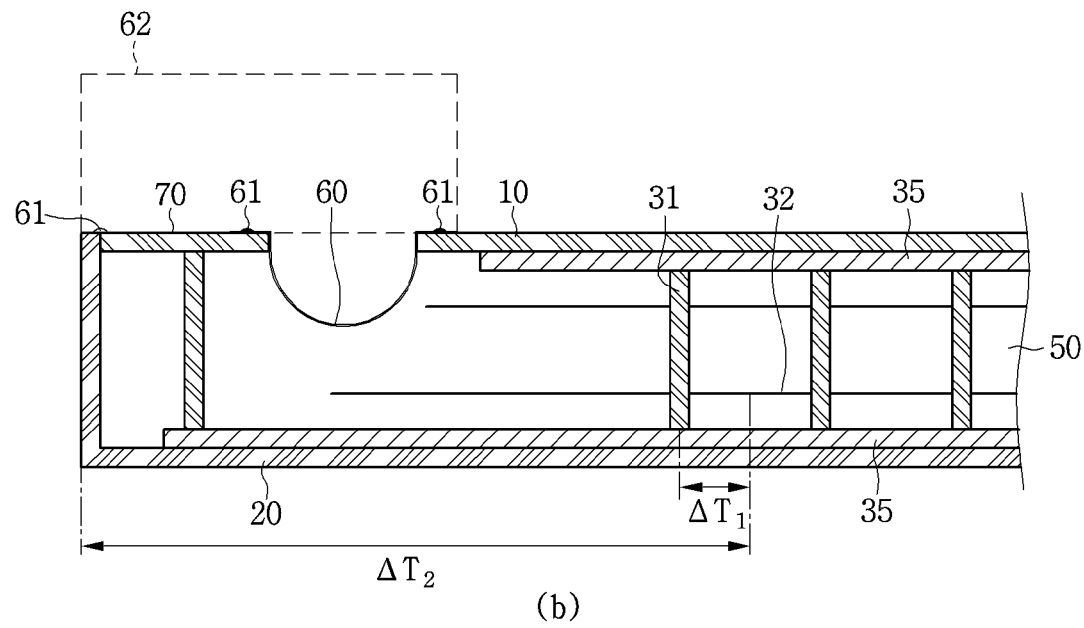
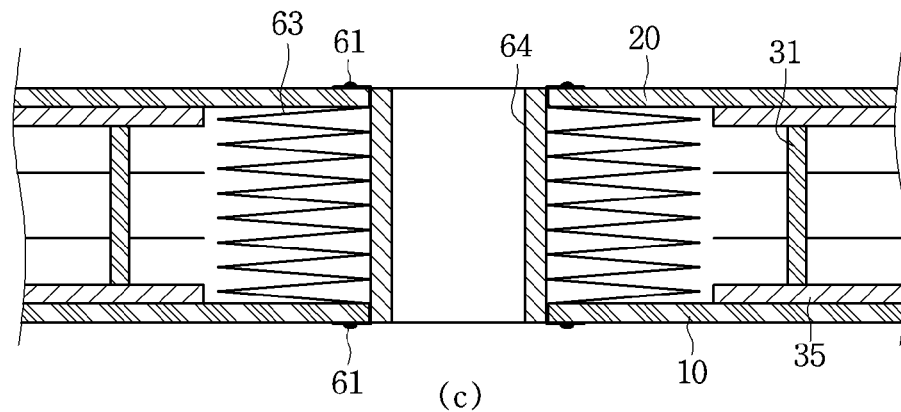

[Fig. 5]
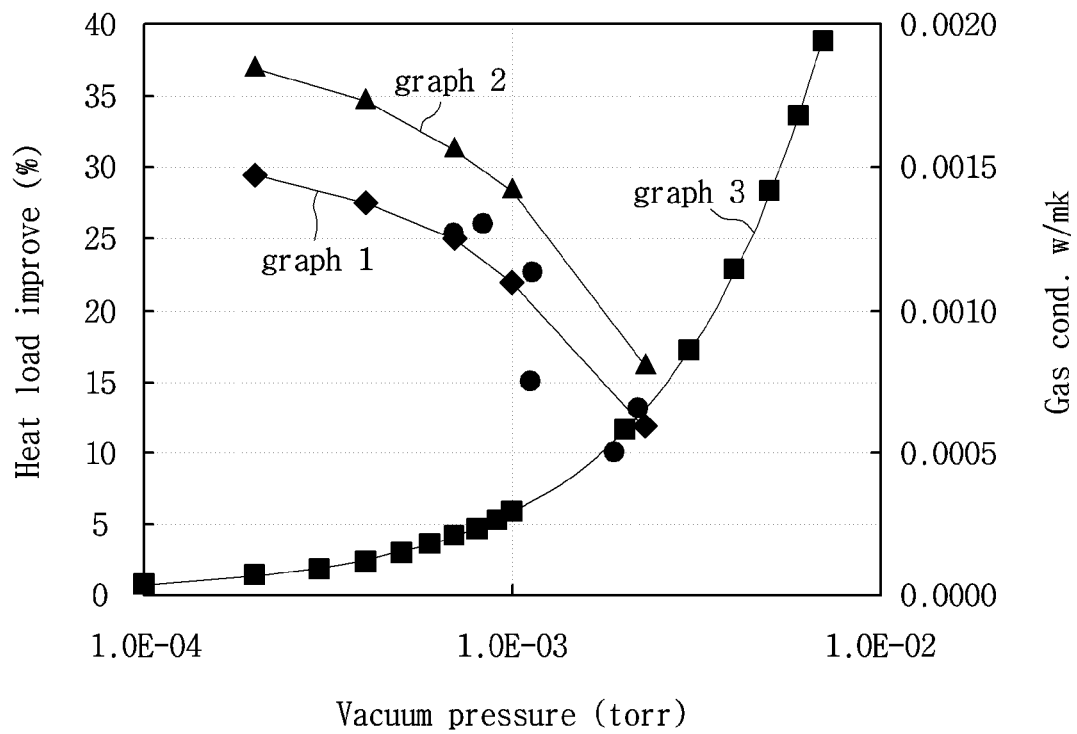
[Fig. 6]
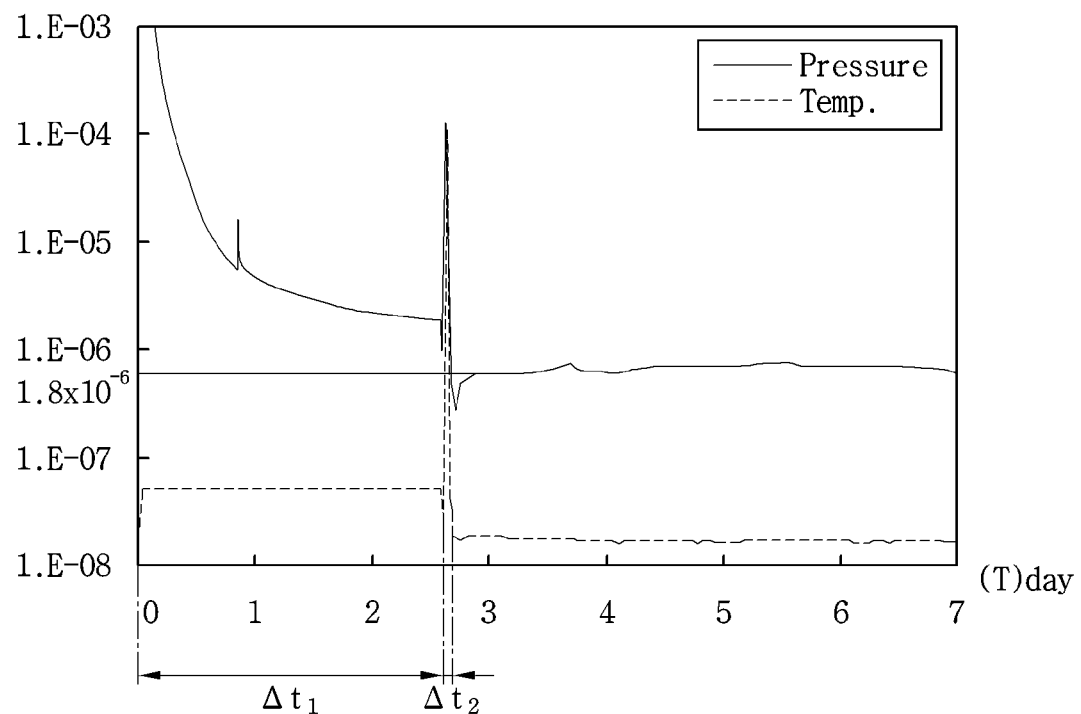

[Fig. 7]
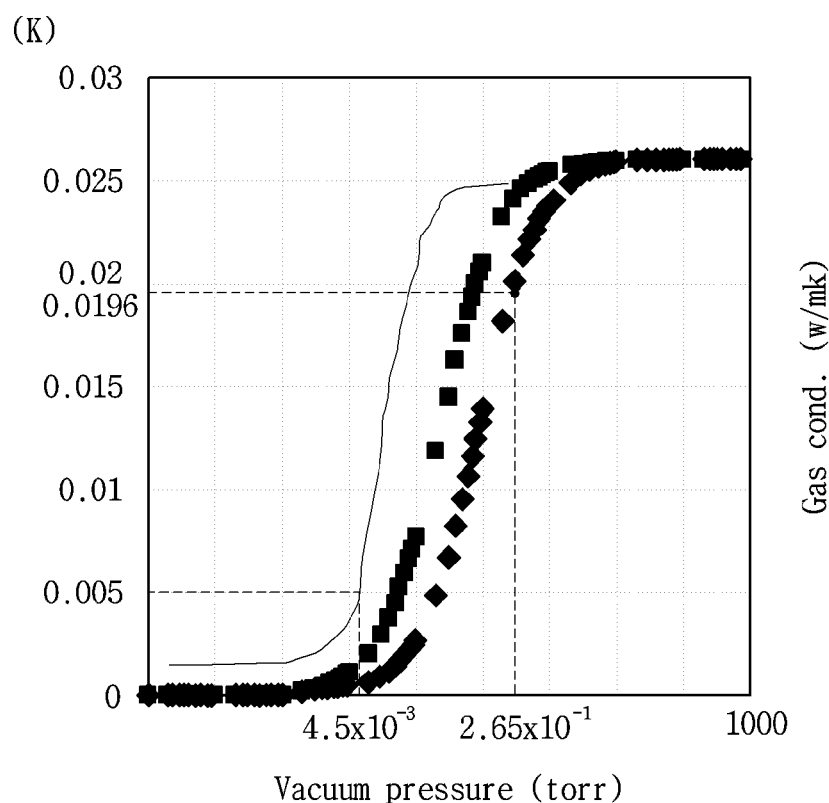
[Fig. 8]
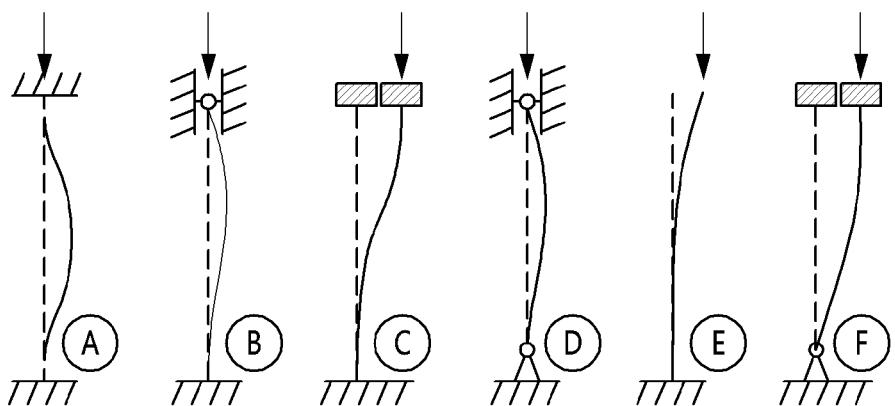

[Fig. 9]
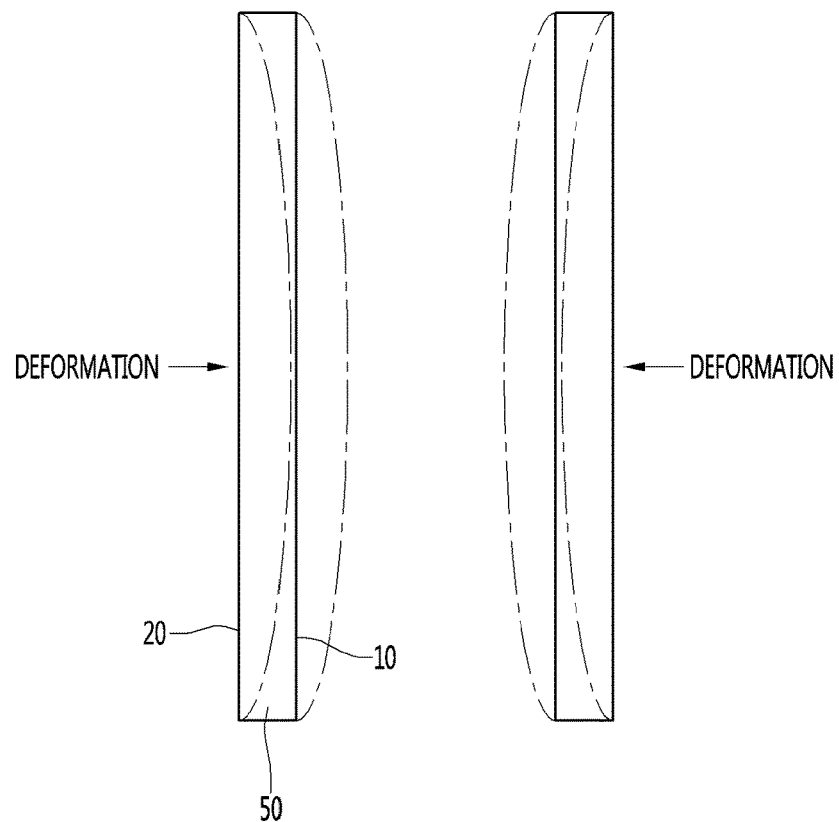
[Fig. 10]
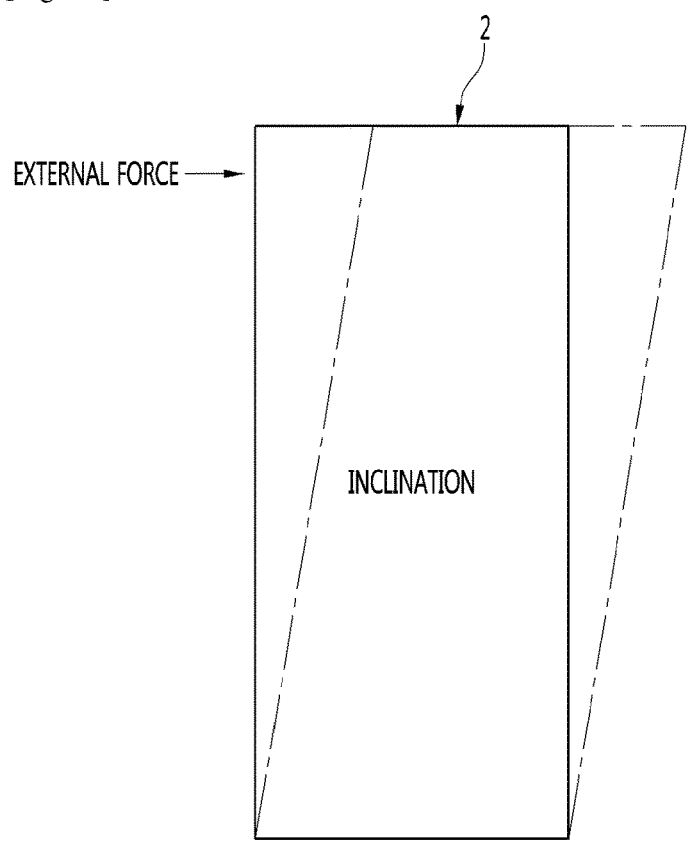

[Fig. 11]
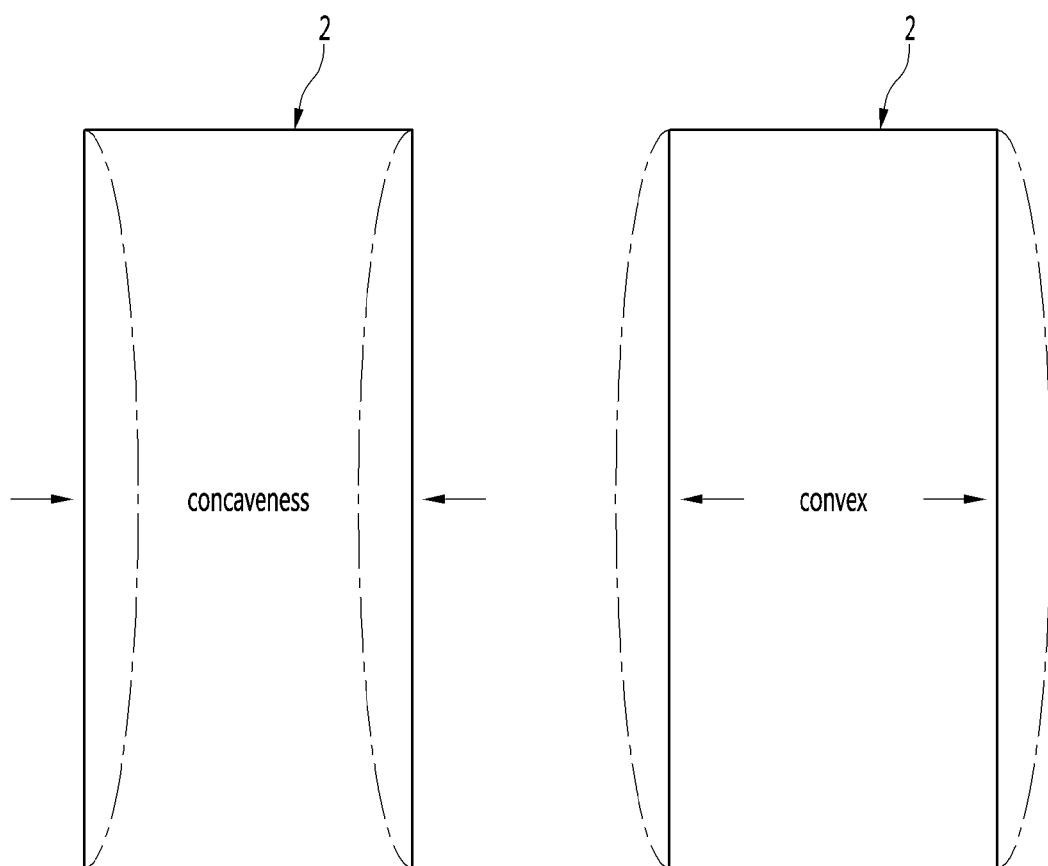

[Fig. 12]
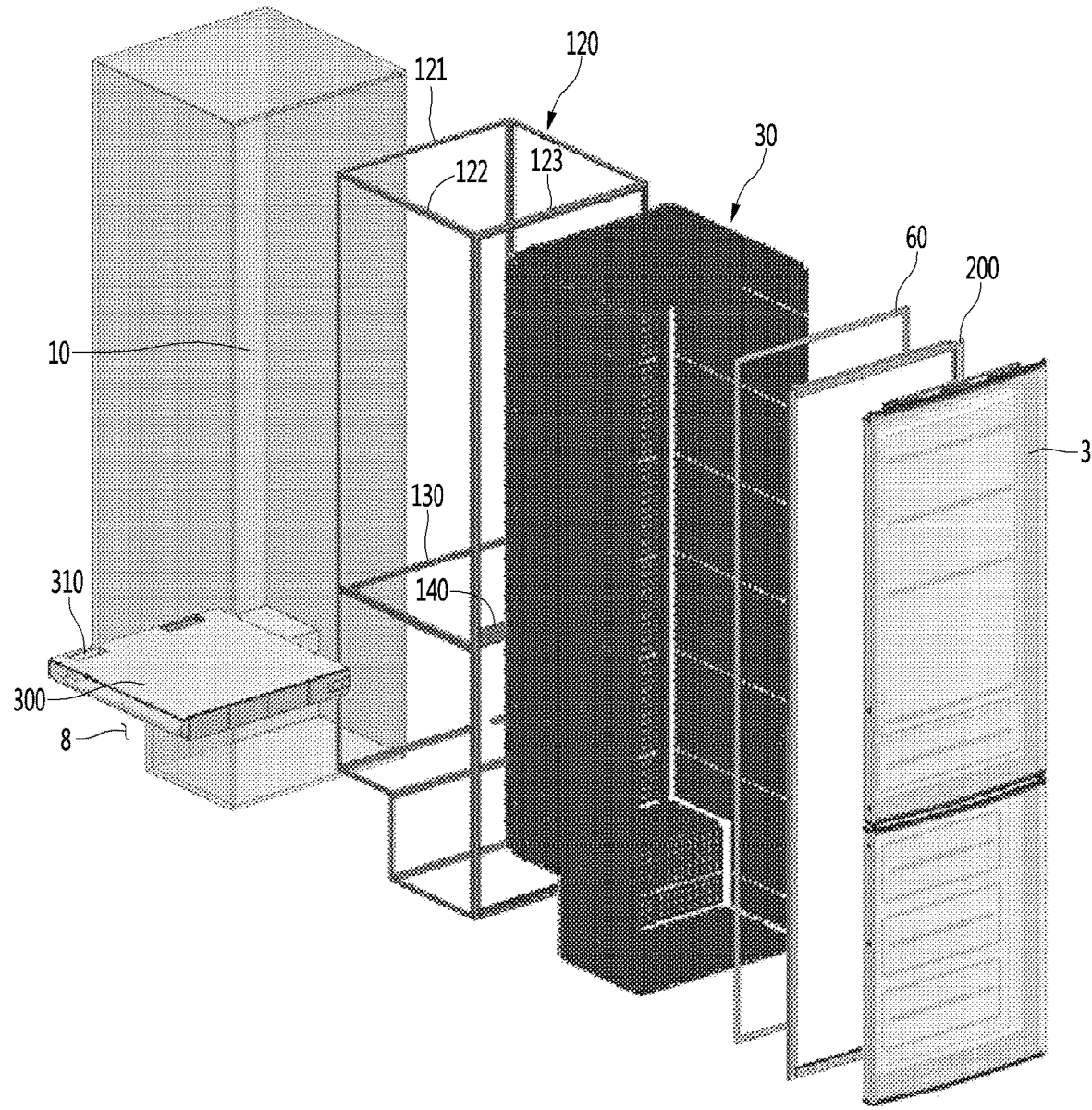

[Fig. 13]
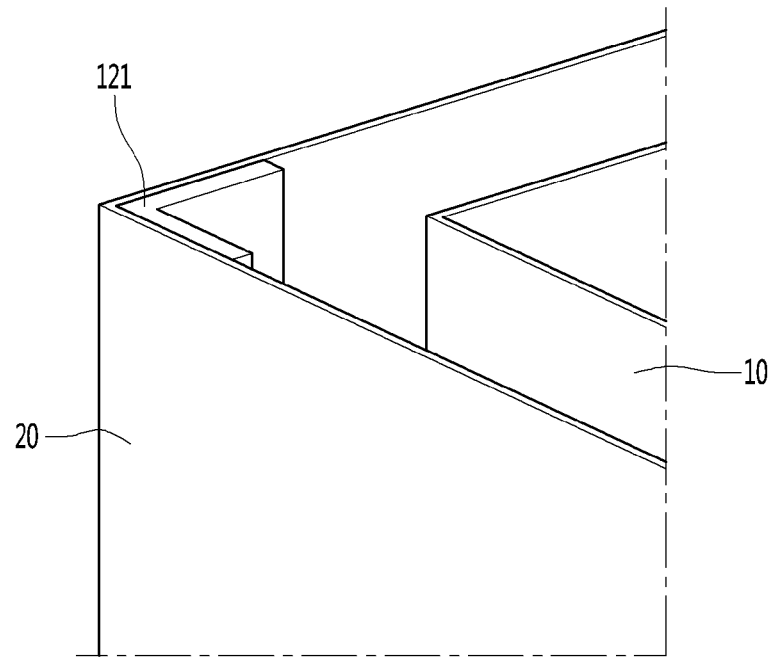
[Fig. 14]
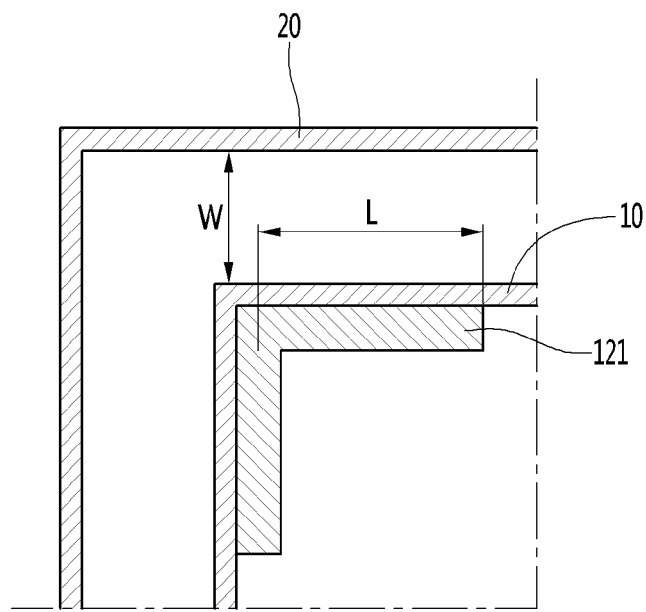

[Fig. 15]
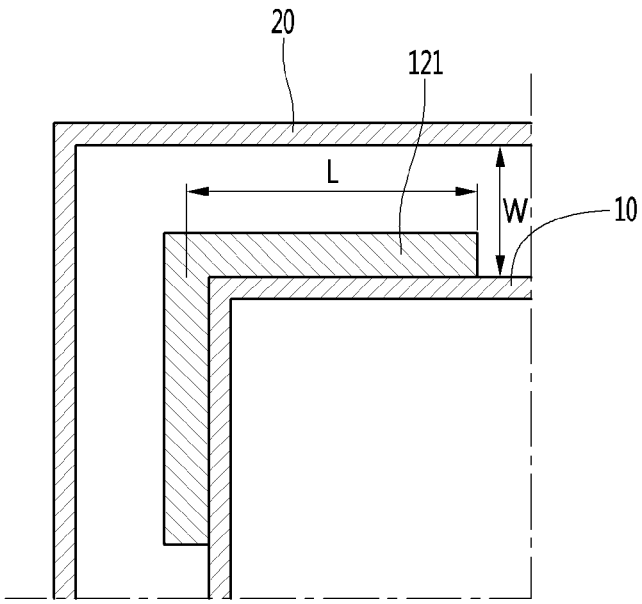
[Fig. 16]
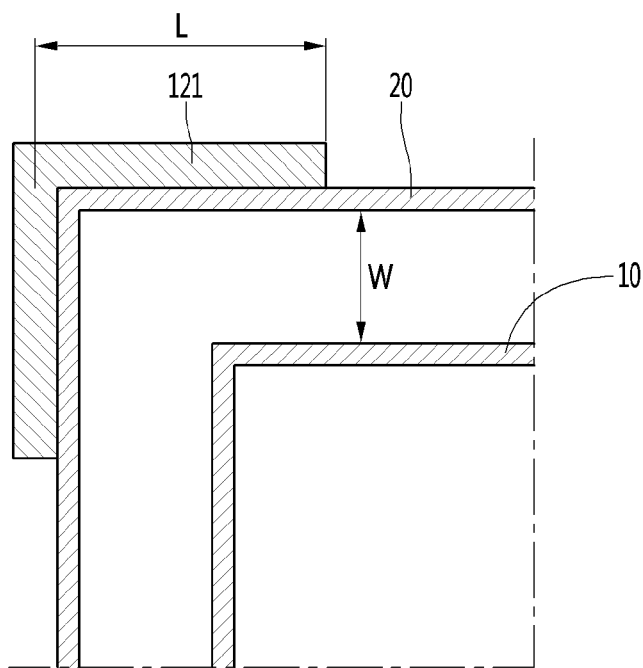

[Fig. 17]
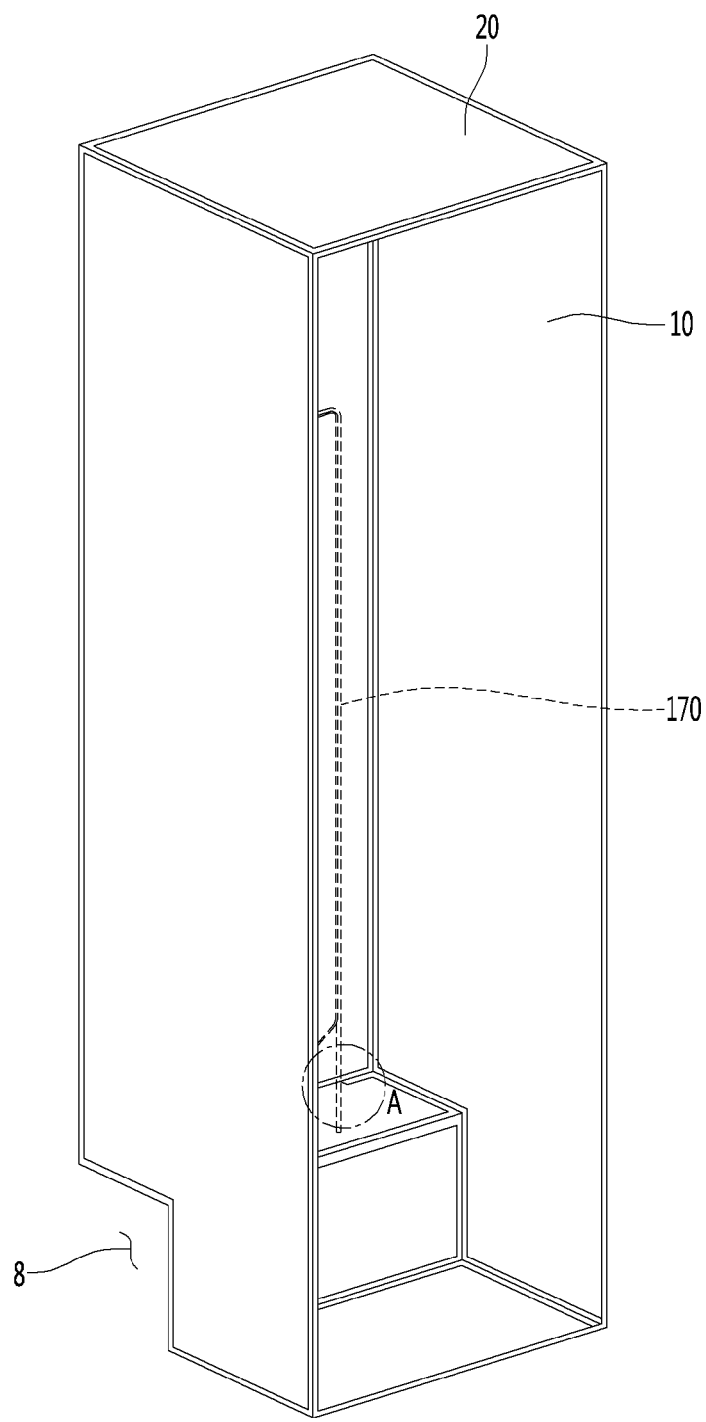

[Fig. 18]
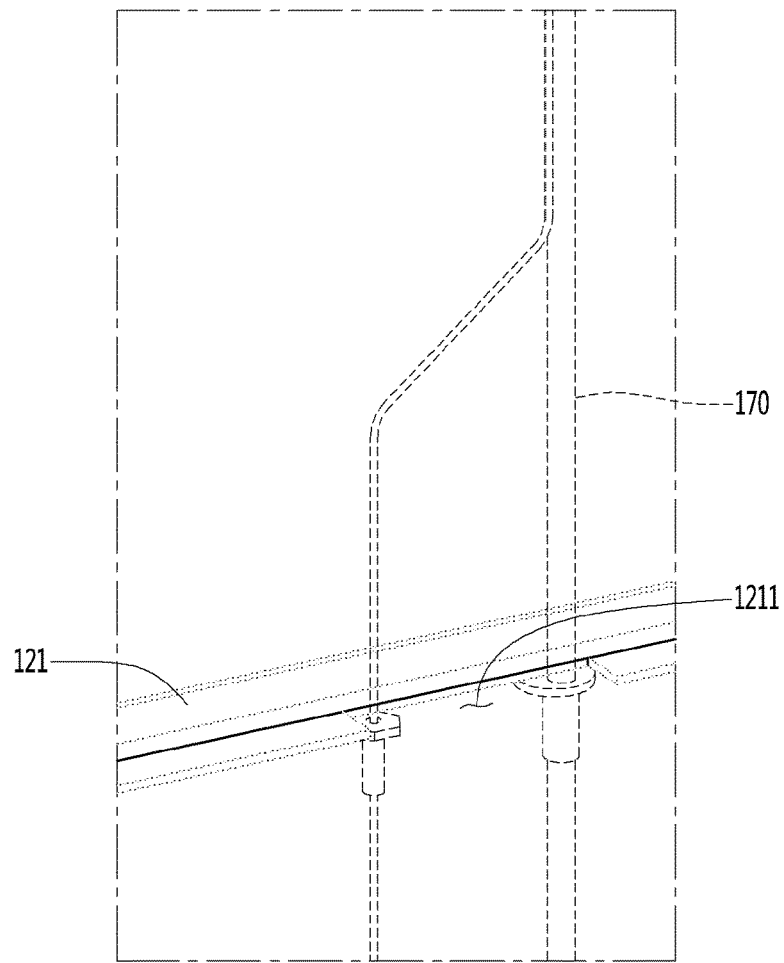
[Fig. 19]
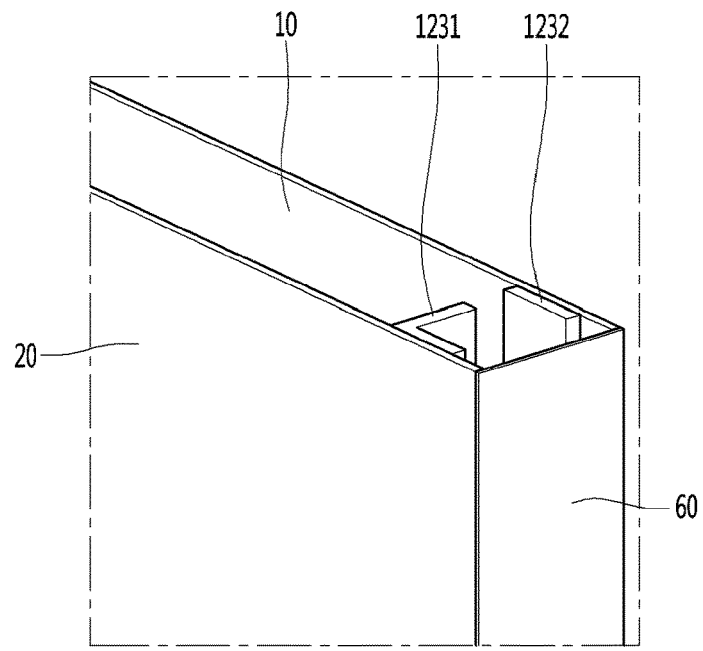

[Fig. 20]
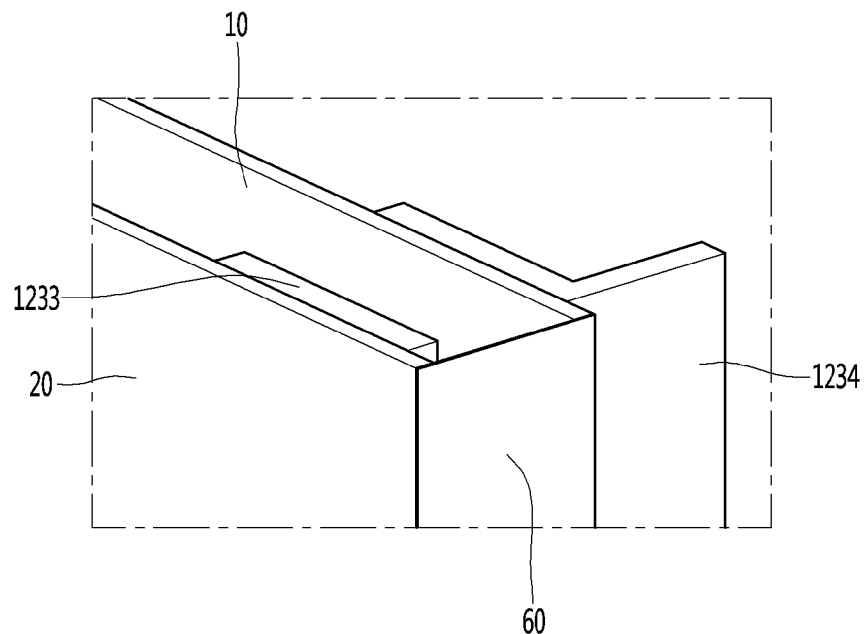
[Fig. 21]
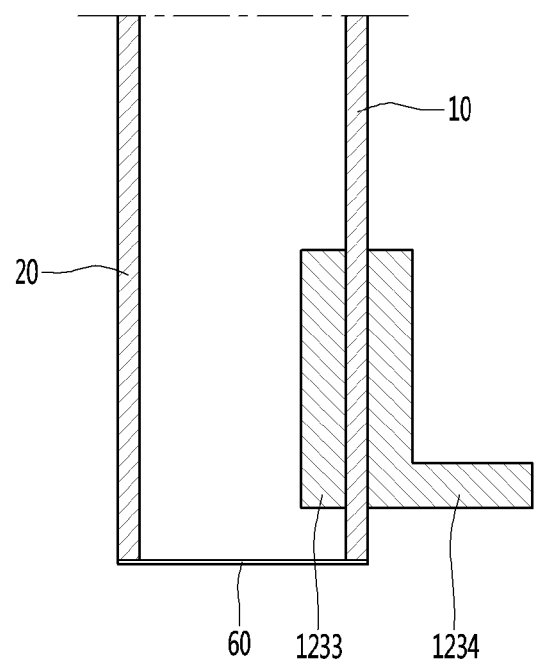

[Fig. 22]
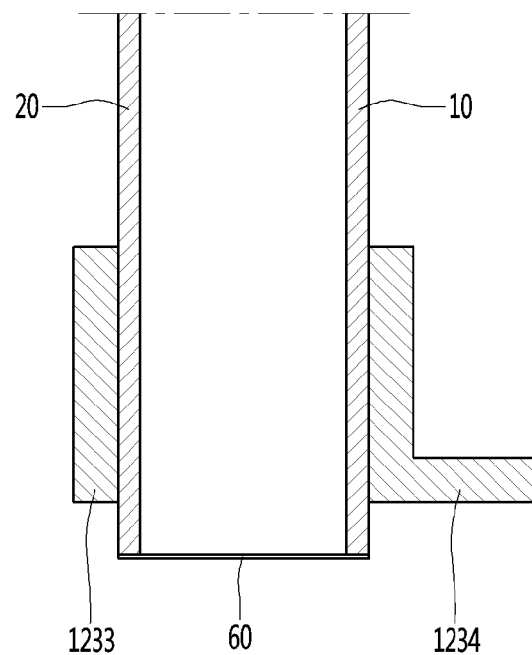
[Fig. 23]
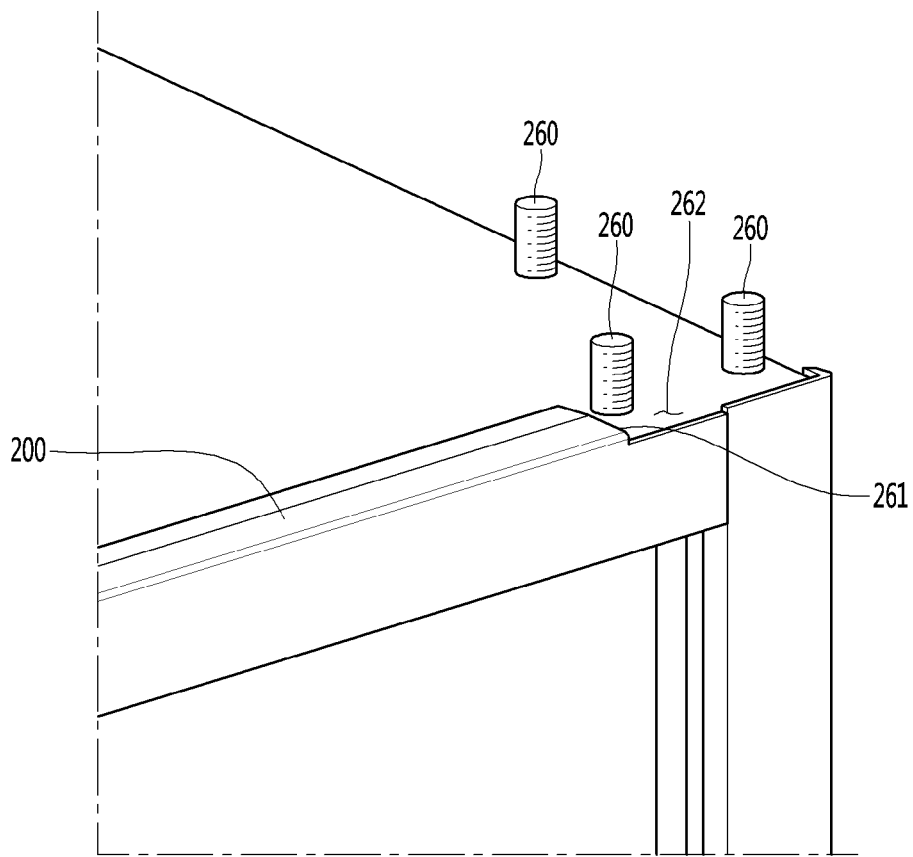

[Fig. 24]
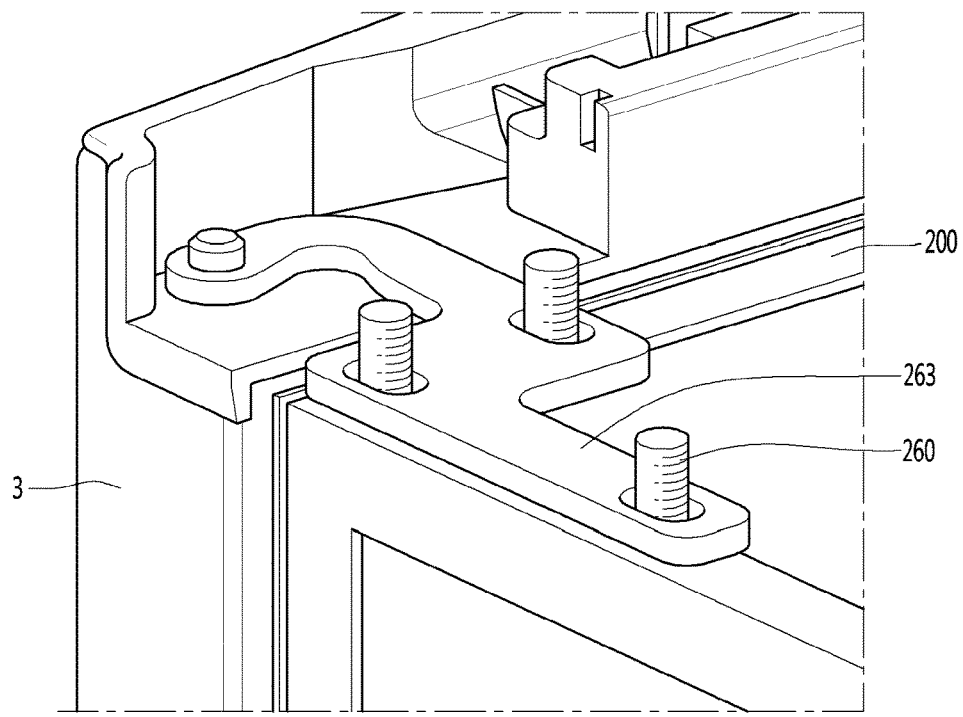
[Fig. 25]
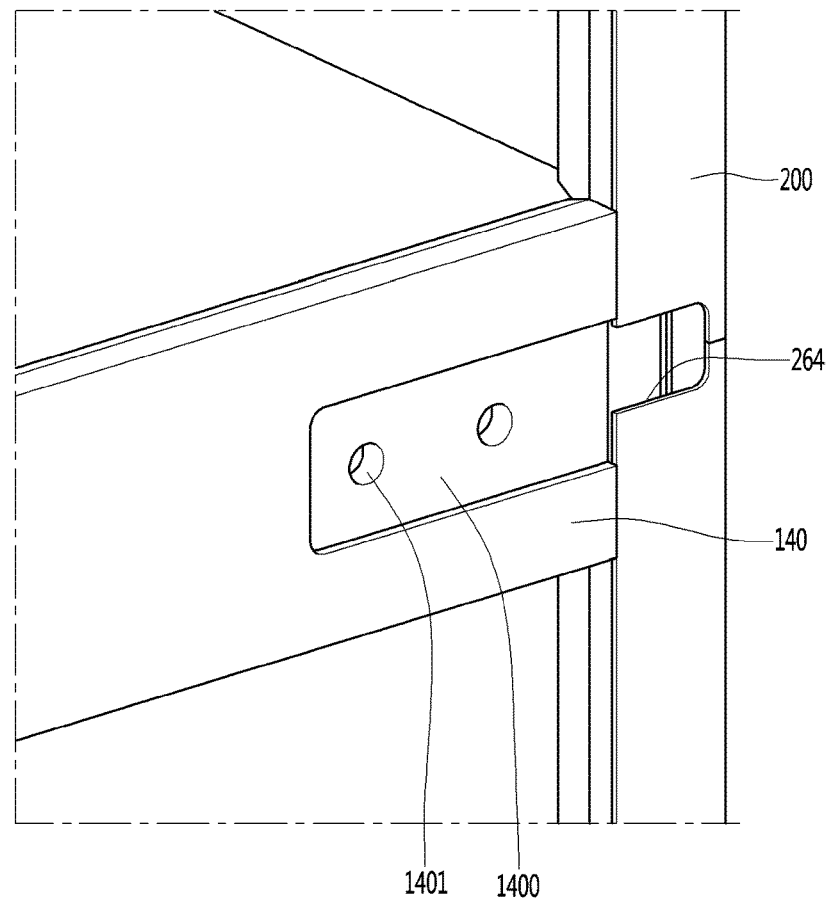

[Fig. 26]
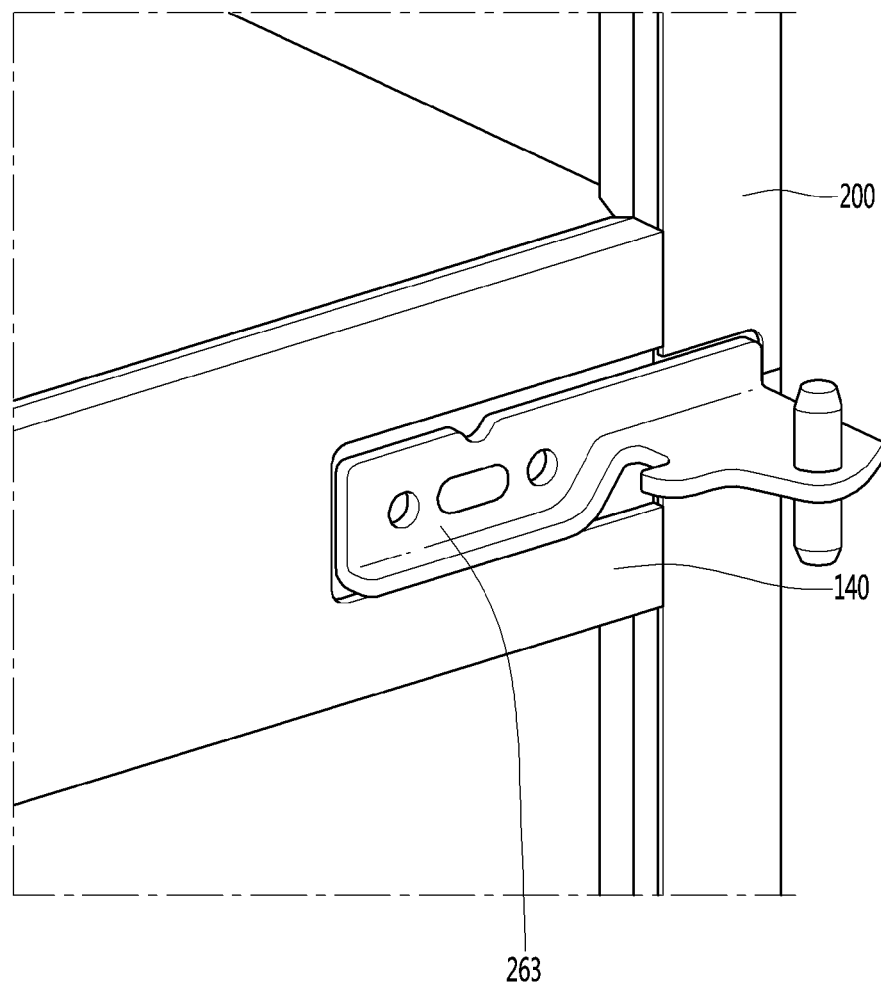

[Fig. 27]
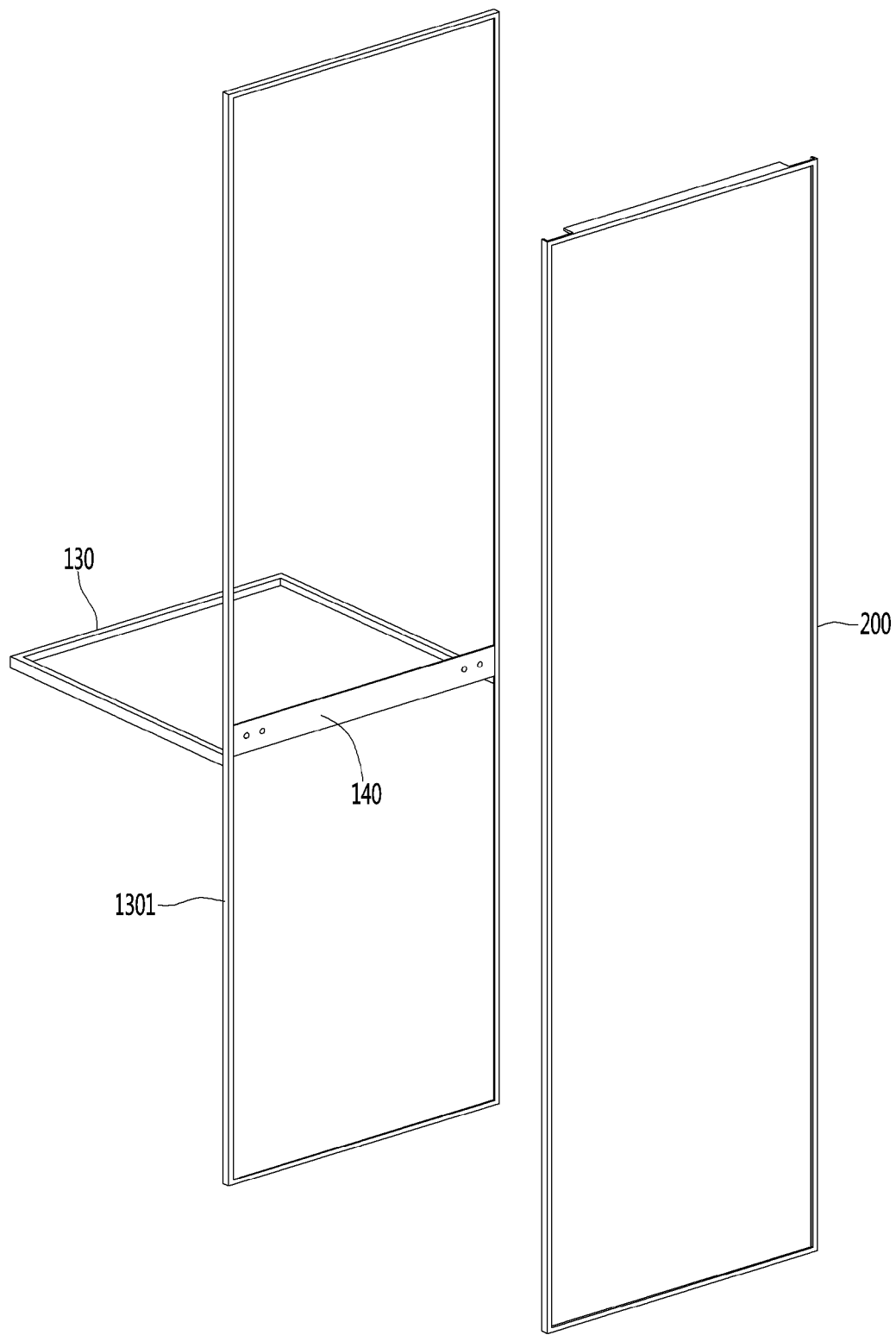

[Fig. 28]
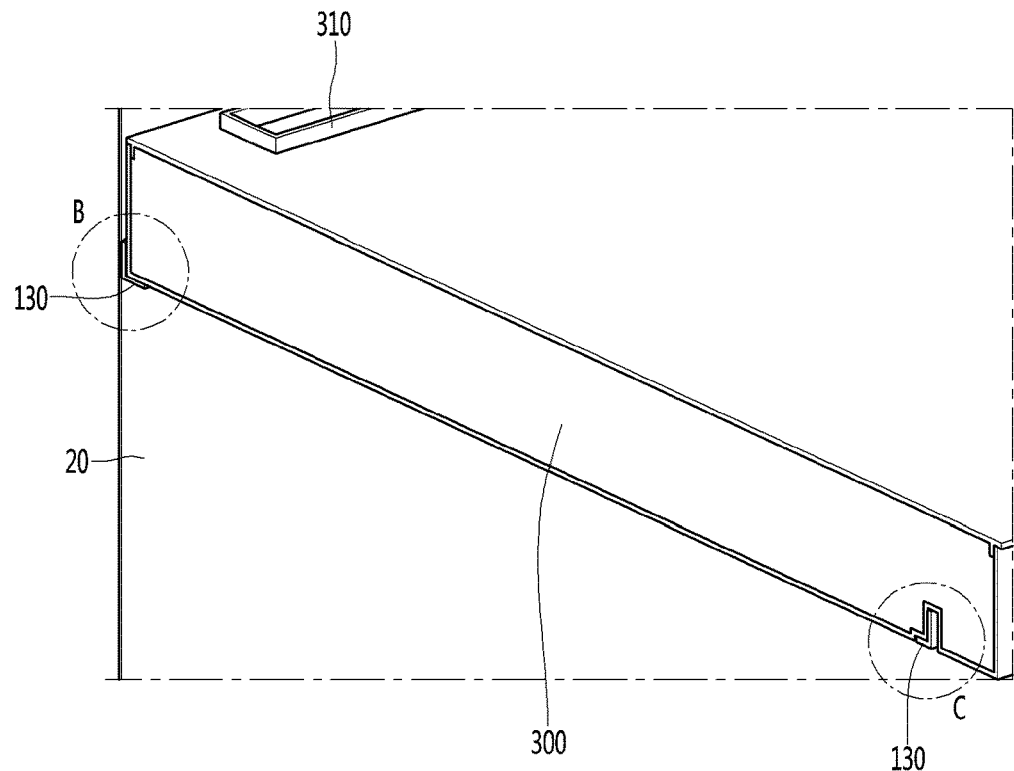
[Fig. 29]
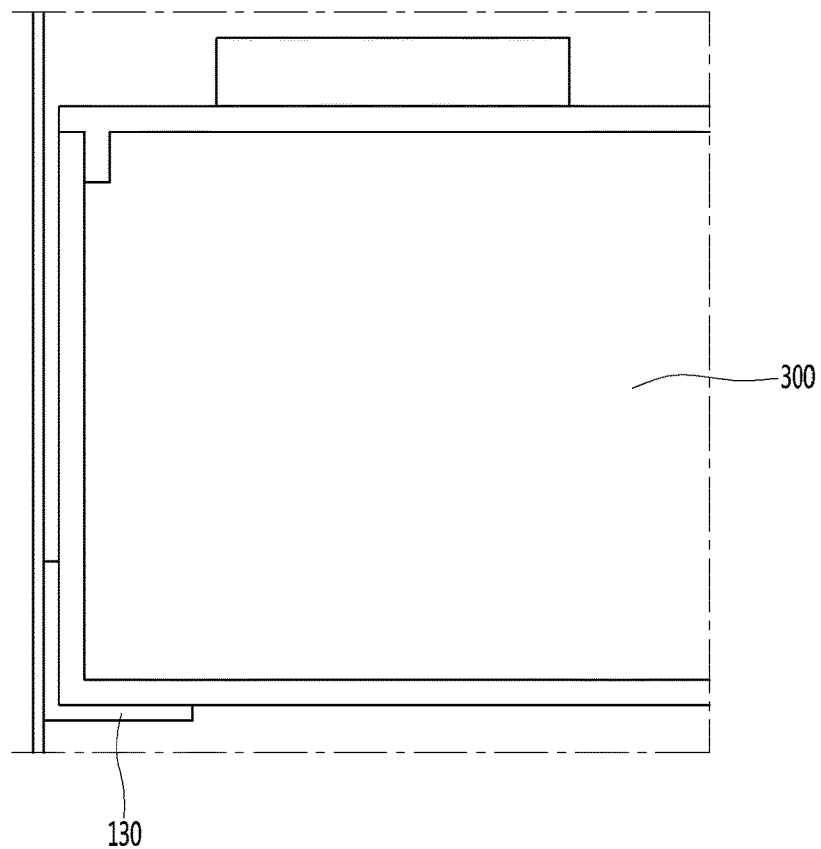

[Fig. 30]
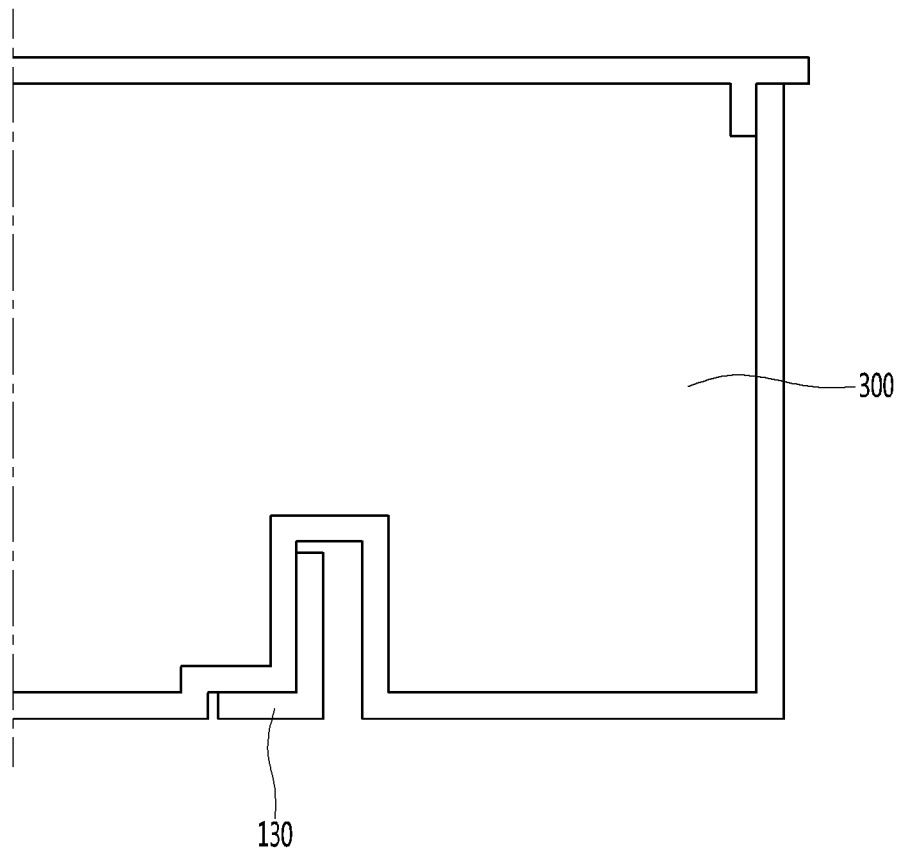
[Fig. 31]
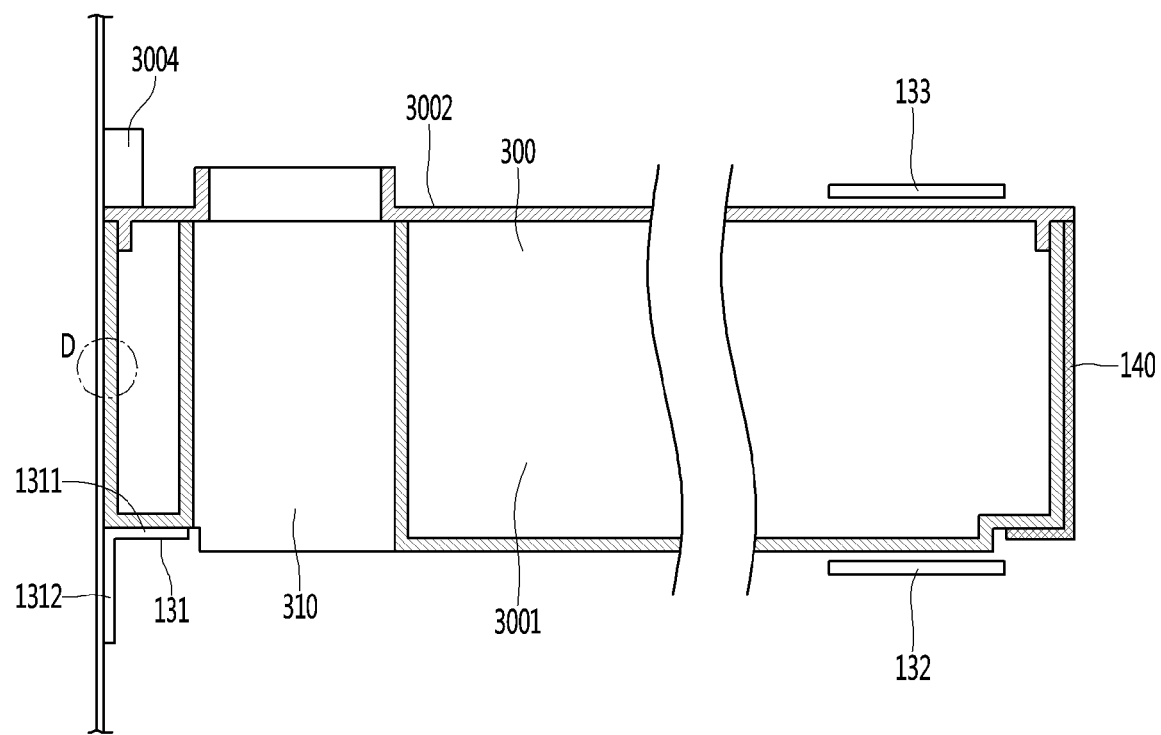

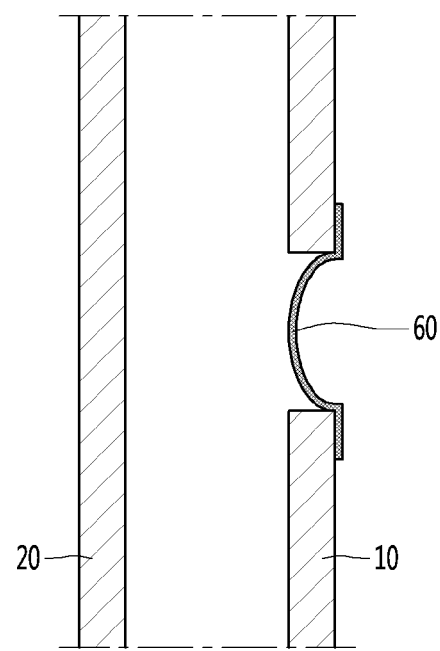
[Fig. 32]

VACUUM ADIABATIC BODY AND REFRIGERATOR

CROSS-REFERENCE TO RELATED PATENT APPLICATIONS

This application is a U.S. National Stage Application under 35 U.S.C. § 371 of PCT Application No. PCT/KR2018/015706, filed Dec. 11, 2018, which claims priority to Korean Patent Application No. 10-2017-0171596, filed Dec. 13, 2017, whose entire disclosures are hereby incorporated by reference. This application is related to copending U.S. application Ser. No. 16/766,562, U.S. application Ser. No. 16/766,215, U.S. application Ser. No. 16/768,379, and U.S. application Ser. No. 16/767,899, whose entire disclosures are also hereby incorporated by reference.

BACKGROUND

1. Field

The present disclosure relates to a vacuum adiabatic body and a refrigerator.

2. Background

A vacuum adiabatic body is a structure for suppressing heat transfer by providing a vacuum in the interior thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 mm or more is generally provided. However, the internal volume of the refrigerator is therefore reduced. In order to increase the internal volume of a refrigerator, there is an attempt to apply a vacuum adiabatic body to the refrigerator.

In a first example, Korean Patent No. 10-0343719 discloses a method in which a vacuum adiabatic panel is prepared and then built in walls of a refrigerator, and the exterior of the vacuum adiabatic panel is finished with a separate molding as Styrofoam (polystyrene). According to this method, additional foaming is not required, and the adiabatic performance of the refrigerator is improved. However, fabrication cost is increased, and a fabrication method is complicated.

As another example, a technique of providing walls using a vacuum adiabatic material and additionally providing adiabatic walls using a foam filling material has been disclosed in Korean Patent Publication No. 10-2015-0012712. According to the technique described in this reference, fabrication cost is increased, and a fabrication method is complicated.

As another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Publication No. US20040226956A1. However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of this reference is limited to cryogenic refrigerating apparatuses and may not be applied to refrigerating apparatuses used in general households.

As a further alternative, Korean Patent Application Publication No. 10-2017-0016187 discloses a vacuum adiabatic body and a refrigerator. However, there is a problem in that the manufacturing thereof is complicated and the internal volume of the refrigerator is greatly reduced.

In addition, since the internal space of the vacuum adiabatic body is empty in a vacuum, the strength of the vacuum adiabatic body is weaker than that of the product of the related art filled with a resin material such as polyurethane, which causes a problem that the deformation such as bending or buckling is generated.

BRIEF DESCRIPTION OF DRAWINGS

The embodiments will be described in detail with reference to the following drawings in which like reference numerals refer to like elements wherein:

FIG. 1 is a perspective view of a refrigerator according to an embodiment.

FIG. 2 is a view schematically showing a vacuum adiabatic body used in a main body and a door of the refrigerator.

FIG. 3 is a view showing various embodiments of an internal configuration of a vacuum space part.

FIG. 4 is a view showing various embodiments of conductive resistance sheets and peripheral portions thereof.

FIG. 5 illustrates graphs showing changes in adiabatic performance and changes in gas conductivity with respect to vacuum pressures by applying a simulation.

FIG. 6 illustrates graphs obtained by observing, over time and pressure, a process of exhausting the interior of the vacuum adiabatic body when a supporting unit is used.

FIG. 7 illustrates graphs obtained by comparing vacuum pressures and gas conductivities.

FIG. 8 is a modeling diagram illustrating various loading conditions given to an upright vacuum adiabatic body.

FIGS. 9 to 11 are views for explaining deformation of the vacuum adiabatic body.

FIG. 12 is an exploded perspective view illustrating a refrigerator according to an embodiment.

FIG. 13 is a partially cutaway sectional view of a rear corner portion of the vacuum adiabatic body.

FIG. 14 is a sectional view of a vacuum adiabatic body illustrating a rear frame according to another embodiment.

FIG. 15 is a sectional view of a vacuum adiabatic body illustrating a rear frame according to another embodiment.

FIG. 16 is a sectional view of a vacuum adiabatic body illustrating a rear frame according to another embodiment.

FIG. 17 is a view illustrating a heat exchange pipeline in a vacuum adiabatic body in which a reinforcing frame is installed.

FIG. 18 is an enlarged view illustrating portion A in FIG. 17.

FIG. 19 is a sectional perspective view of a vacuum adiabatic body illustrating a reinforcing frame according to another embodiment.

FIG. 20 is a sectional perspective view of a vacuum adiabatic body illustrating a reinforcing frame according to another embodiment.

FIG. 21 is a sectional view of a vacuum adiabatic body illustrating a reinforcing frame according to another embodiment.

FIG. 22 is a sectional view of a vacuum adiabatic body illustrating a reinforcing frame according to another embodiment.

FIGS. 23 and 24 are perspective views illustrating a certain vertex portion of the vacuum adiabatic body, wherein FIG. 23 is a view illustrating a state before a door hinge is installed, and FIG. 24 is a view illustrating a state where the door hinge is installed.

FIGS. 25 and 26 are diagrams for explaining the door hinge provided in the mullion portion, wherein FIG. 25 is a view illustrating a state where the door hinge is installed, and FIG. 25 is a view illustrating a state before the door hinge is installed.

FIG. 27 is a perspective view illustrating a mullion support frame.

FIG. 28 is a cutaway perspective view for explaining the action of the mullion seating frame.

FIG. 29 is an enlarged sectional view of portion B of FIG. 28.

FIG. 30 is an enlarged sectional view of portion C in FIG. 28.

FIG. 31 is a sectional view for explaining a mullion seating frame according to another embodiment.

FIG. 32 is an enlarged view of portion D in FIG. 31.

DETAILED DESCRIPTION

In the following description, the term 'vacuum pressure' means a certain pressure state lower than atmospheric pressure. In addition, the expression that a vacuum degree of A is higher than that of B means that a vacuum pressure of A is lower than that of B.

FIG. 1 is a perspective view of a refrigerator according to an embodiment. Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber or a freezing chamber.

The refrigerator 1 includes parts constituting a freezing cycle in which cold air is supplied into the cavity 9. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and air blown from the fan may pass through the evaporator 7 and then into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member (or first plate layer) 10 for providing a wall of a low-temperature space (e.g., an interior of the refrigerator 1), a second plate member (or second plate layer) 20 for providing a wall of a high-temperature space (e.g., an exterior of the refrigerator 1), a vacuum space part (or space) 50 defined as a gap part between the first and second plate members 10 and 20. Also, the vacuum adiabatic body includes the conductive resistance sheets 60 and 63 for preventing heat conduction between the first and second plate members 10 and 20. A sealing part (or sheet) 61 for sealing the first and second plate members 10 and 20 is provided such that the vacuum space part 50 is in a sealed state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space. Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

FIG. 3 is a view showing various embodiments of an internal configuration of the vacuum space part. First, referring to FIG. 3 (section a), the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit (or support) 30 may be provided to reduce the deformation of the vacuum space part 50. A material of the supporting unit 30 may include a resin selected from the group consisting of PC, glass fiber PC, low outgassing polycarbonate (PC), polyphenylene sulfide (PPS), and liquid crystal polymer (LCP) so as to obtain high compressive strength, low outgassing and water absorbance, low thermal conductivity, high compressive strength at high temperature, and excellent machinability.

The supporting unit 30 includes bars 31. The bars 31 may extend in a direction substantially perpendicular to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20. The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 can be diffused through the support plate 35.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3 (section b), the distance between the plate members is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer. In this embodiment, the vacuum adiabatic body can be fabricated without using the radiation resistance sheet 32.

Referring to FIG. 3 (section c), the supporting unit 30 maintaining the vacuum space part 50 man not be provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a polyethylene (PE) material, and may be provided in a state in which holes are formed therein.

In this embodiment, the vacuum adiabatic body can be fabricated without using the supporting unit 30. In other words, the porous substance 33 can simultaneously serve as the radiation resistance sheet 32 and the supporting unit 30. A case where the porous substance 33 is filled in the vacuum space part 50 will be described in detail later.

FIG. 4 is a view showing various embodiments of the conductive resistance sheets and peripheral portions thereof. Structures of the conductive resistance sheets are briefly illustrated in FIG. 2, but will be understood in detail with reference to FIG. 4. First, a conductive resistance sheet proposed in FIG. 4 (section a) may be preferably applied to the main body-side vacuum adiabatic body. Specifically, the first and second plate members 10 and 20 are to be sealed so as to allow a vacuum to be formed in the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts (or sealing regions) 61 at which both ends of the conductive resistance sheet 60 are sealed to define at least one portion of the wall for the third space and maintain the vacuum state. The conductive resistance sheet 60 may be provided as a thin foil in unit of micrometer so as to reduce the amount of heat conducted along the wall for the third space. The sealing parts may be provided as welding spots. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as caulking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part (or shield) 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. So as to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous substance or a separate adiabatic structure.

A conductive resistance sheet proposed in FIG. 4 (section b) may be preferably applied to the door-side vacuum adiabatic body. In FIG. 4 (section b), portions different from those of FIG. 4 (section a) are described in detail, and the same description is applied to portions identical to those of FIG. 4 (section a). A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side part of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4 (section c) may be preferably installed in the pipeline passing through the vacuum space part. In FIG. 4 (section c), portions different from those of FIGS. 4a and 4b are described in detail, and the same description is applied to portions identical to those of FIGS. 4 (section a) and 4 (section b). A conductive resistance sheet having the same shape as that of FIG. 4a, preferably, a wrinkled or folded conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4 (section a). Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/m K.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat is smaller than the heat transfer amount by the solid conduction heat but larger than the heat ④ transfer amount of the gas conduction heat ③. For example, the heat transfer amount by the radiation transfer heat ④ may correspond to about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Equation 1.

$$eKsolid\ conduction\ heat > eKradiation\ transfer\ heat > eKgas\ conduction\ heat \qquad \text{Equation 1:}$$

Here, the effective heat transfer coefficient (eK) is a value that can be measured using a shape and temperature differences of a target product. The effective heat transfer coefficient (eK) is a value that can be obtained by measuring a total heat transfer amount and a temperature at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k = QL/A\Delta T$. Here, Q denotes a calorific value (W) and may be obtained using a calorific value of a heater. A denotes a sectional area ($m^2$) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference (ΔT) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance.

According to an embodiment, a temperature difference ΔT1 between a geometric center formed by adjacent bars 31 and a point at which each of the bars 31 is located may be preferably provided to be less than 0.5° C. Also, a temperature difference ΔT2 between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may bad influence on the external appearance of refrigerator. The radiation resistance sheet 32 may be preferably made of a material that has a low emissivity and can be easily subjected to thin film processing. Also, the radiation resistance sheet 32 is to ensure a strength enough not to be deformed by an external impact. The supporting unit 30 is provided with a strength enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength than the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. The conductive resistance sheet may be preferably made of a material that is easily deformed by the vacuum pressure and has the lowest stiffness. Even when the porous substance 33 is provided in the vacuum space part 50, the conductive resistance sheet may preferably have the lowest stiffness, and the plate member and the side frame may preferably have the highest stiffness.

Hereinafter, a vacuum pressure preferably determined depending on an internal state of the vacuum adiabatic body. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist the heat transfer by applying only the supporting unit 30. Alternatively, the porous substance 33 may be filled together with the supporting unit in the vacuum space part 50 to resist the heat transfer. Alternatively, the vacuum space part may resist the heat transfer not by applying the supporting unit but by applying the porous substance 33.

The case where only the supporting unit is applied will be described. FIG. 5 illustrates graphs showing changes in adiabatic performance and changes in gas conductivity with respect to vacuum pressures by applying a simulation. Referring to FIG. 5, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased. However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

FIG. 6 illustrates graphs obtained by observing, over time and pressure, a process of exhausting the interior of the vacuum adiabatic body when the supporting unit is used. Referring to FIG. 6, in order to cause the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta t1$). After that, the vacuum space part 50 is disconnected from the vacuum pump, and heat is applied to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr. In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{-6}$ Torr.

FIG. 7 illustrates graphs obtained by comparing vacuum pressures and gas conductivities. Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr can be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous substance, the size of the gap ranges from a few micrometers to a few hundreds of micrometers. In this case, the amount of radiation heat transfer is small due to the porous substance even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr. When the supporting unit and the porous substance are provided together in the vacuum space part, a vacuum pressure may be created and used, which is middle between the vacuum pressure when only the supporting unit is used and the vacuum pressure when only the porous substance is used. In a case where only the porous substance is used, the lowest vacuum pressure can be created and used.

As described above, since the thickness of the wall of the vacuum adiabatic body according to the embodiment is thin, there is a problem that the vacuum adiabatic body is weak against the external load. These problems can cause various deformations of various structures and cause difficulties in the application of the products.

FIG. 8 is a modeling diagram illustrating various loading conditions given to an upright vacuum adiabatic body. Referring to FIG. 8, A is a modeling when both the upper and lower sides are free ends, B is modeling when the lower side is a fixed end and the upper side is a free end in the up and down direction, C is modeling when the lower side is a fixed end and the upper side is a free end in the left and right direction, D is the modeling when the lower side is the rotation free end and the upper side is a free end in the up and down direction, E is the modeling when the lower side is the fixed end and the upper side is the free end in the forward direction, and F is modeling when the lower side is a rotation free end and the upper side is a free end in the left and right direction. The inventors have carried out a review of various loads to analyze the effect of various loads of FIG. 8 on the upright vacuum adiabatic body, in particular, the refrigerator.

The load may have the effect of microscopically approach of the plate members 10 and 20 of the vacuum adiabatic body, but this is the portion that can be controlled by the supporting unit. The inventor has reviewed bending, deformation, buckling, and the like, which may affect the structure of the vacuum adiabatic body macroscopically, and confirmed that the vacuum adiabatic body can be deformed as illustrated in FIGS. 9 to 11. These drawings are schematic views illustrating all a main body-side vacuum adiabatic body viewed from the front.

Referring to FIG. 9, this drawing illustrates a case where a load is generated on one flat surface of a vacuum adiabatic body. In this case, any one surface of the vacuum adiabatic body can be convexly or concavely deformed. Such a deformation may occur in a case where a relatively large vertical load is generated on any one surface.

Referring to FIG. 10, this drawing illustrates a case where an external force is generated in the horizontal direction at the upper end of the vacuum adiabatic body and in this case, the upper end part of the vacuum adiabatic body can be generally deformed in an inclined manner in one direction. Such deformation may occur when the product is moved or unidirectionally pushed.

Referring to FIG. 11, the present disclosure is applied to a product in which a vacuum adiabatic body has an opening, such as a refrigerator, and a case where the product is subjected to a vertical load. At this time, the peripheral portion of the open portion of the vacuum adiabatic body can be deformed concavely or convexly.

An embodiment for preventing the deformation caused by the load described above acting on the vacuum adiabatic body is illustrated below. Hereinafter, a refrigerator will be described as a main embodiment to explain about a configuration which prevents deformation of the vacuum adiabatic body, but the application of the embodiment is not limited to a refrigerator and can be applied to various products.

FIG. 12 is an exploded perspective view of a refrigerator according to an embodiment. Referring to FIG. 12, since the plate members 10 and 20, the supporting unit 30 introduced into the gap part between the plate members, the conductive resistance sheet 60, and the door 3 are illustrated as already described, a detailed description can refer to the above description.

In addition to the supporting unit (or support) 30, a reinforcing frame 120 for reinforcing the strength of the vacuum adiabatic body can be inserted into the internal space of the plate members 10 and 20, that is, in the vacuum space part 50. In order to protect the conductive resistance sheet 60 from the outside, the sealing frame 200 may further be interposed at the interface contacting the main body 2 and the door 3 each other. The space inside the refrigerator of the first plate member 10 is separated so that the mullion (or partition) 300 can be inserted to maintain the temperature according to the purpose of refrigerating and freezing. The sealing frame may be in contact with the gasket and may be placed between the third space and the door.

The reinforcing frame 120 will be described in more detail. The reinforcing frame 120 may be installed at a corner portion of the vacuum space part 50. In other words, it can be provided at all corners corresponding to all the boundaries where different planes from each other meet. Specifically, the reinforcing frame may include a rear frame 121 which is provided at a rear corner portion of the vacuum adiabatic body, a front frame 123 which is provided at a front corner portion of the vacuum adiabatic body, and a side frame 122 which is provided in a lateral direction connecting the front frames 123 and the rear frame 121.

The reinforcing frame 120 may be made of a thick or strong material as compared with the plate member and may be in contact with the plate member. The front frame 123, the rear frame 121, and the side frame 122 may be fastened to each other and provide as one body to reinforce the strength of an appliance.

As illustrated in FIG. 12, in order to prevent the openings of the vacuum adiabatic body from being concavely or convexly deformed, a mullion seating frame (or partition seating frame) 130 which seat the mullions 300 and a mullion front frame (or partition front frame) 140 may be further provided. The mullion seating frame 130 and the mullion front frame 140 may be provided on the inner surface of the first plate member 10, unlike the reinforcing frame 120. Thereby supporting and connecting operations of the mullion 300 can be performed. The mullion front frame may be provided to prevent deformation of the opening portion of the vacuum adiabatic body in a case where the mullion 300 is not provided. In this case, the mullion front frame can be abbreviated as a front frame.

It will be appreciated that the mullion seating frame 130 and the mullion front frame 140 serve to place the mullion 300 at a predetermined position in the refrigerator. In addition, it is possible to reinforce the strength of a pair of adjacent frames among the four rear frames 121 and the front frame 123 extending in the up and down direction. For example, the mullion front frame 140 may support a pair of front frames 123 extending in the up and down direction to prevent deformation of the opening portion of the vacuum adiabatic body as described with reference to FIG. 8.

The mullion seating frame 130 and the mullion front frame 140 are directly separated from the reinforcing frame 120 and indirectly connected to each other by another separate member to reinforce the strength. For the action of strength reinforcement, the reinforcing frame 120, the mullion seating frame 130, and the mullion front frame 140 are made of a material having a predetermined strength, and when being compared with the plate members 10 and 20, solid materials may be applied or thick materials may be used.

Accordingly, in addition to the rear frame 121, the front frame 123, and the side frame 122, which are provided as a portion of the reinforcing frame 120, the mullion seating frame 130 and the mullion front frame 140 can also be performed as a reinforcing frame. Accordingly, the rear frame 121 may be referred to as a first reinforcing frame, and the front frame 123 may be referred to as a second reinforcing frame. Further, the side frame 122 which connects the first reinforcing frame and the second reinforcing frame and is provided in the lateral direction may be referred to as a third reinforcing frame. In addition, the mullion seating frame 130 and the mullion front frame 140 may be referred to as a fourth reinforcing frame. In a case where the mullion seating frame 130 is not provided, the mullion front frame 140 may be referred to as a fourth reinforcing frame.

The first reinforcing frame and the second reinforcing frame can prevent the upper end of the vacuum adiabatic body from being generally deformed in an inclined manner in any direction. For this purpose, as illustrated, the first and second reinforcing frames may extend along the vertically-formed corner of the vacuum adiabatic body formed in the up and down direction and be positioned near the corner. Here, the corner can be regarded as a boundary line where different planes of the vacuum adiabatic body from each other meet. The first and second reinforcing frames may be provided on at least one of the first plate member and the second plate member.

The second reinforcing frame can not only prevent the overall inclination of the upper part of the vacuum adiabatic material but also prevent the peripheral portion of the opened portion of the vacuum adiabatic body from being deformed concavely or convexly. To this end, the second reinforcing frame may extend along the peripheral portion of the vacuum adiabatic body and be positioned near the peripheral portion.

The fourth reinforcing frame may extend in a direction which traverses the opening so as to prevent deformation of the peripheral portion of the opened portion. Meanwhile, the mullion 300 may be provided with a mullion cold air flow path 310 to allow cool air to pass through the two storage spaces divided by the mullion 300, as will be described in detail later.

FIG. 13 is a partial cutaway sectional view of the rear corner portion of the vacuum adiabatic body. Referring to FIG. 13, the rear frame 121 is provided to have a bent shape according to a sectional shape of a bent corner of the second plate member 20. The rear frame 121 supports the rear surface part and the side surface part of the second plate member 20 together so that the strength of each surface can be reinforced. In addition, the rear frame 121 can reinforce strength against bending and buckling of the vacuum adiabatic body with high rigidity.

The respective surfaces of the rear frame 121 may be integrally welded or mechanically fastened to respective surfaces of the corresponding second plate member 20. Since the rear frame 121 is mounted on the inner surface of the vacuum space part 50, there is no portion exposed to the outside, so that there is no problem such as interference in the manufacturing process of the appliance.

Although the rear frame 121 is illustrated as an example in the drawing, other reinforcing frames 120 may be also provided in the same sectional shape and may extend along the corner at the same position of the vacuum adiabatic body. Other reinforcement frames can also perform the same strength reinforcement action as the rear frame 121. Optionally, the reinforcement frame 120 may be directly connected to all the frames to each other to further enhance the reliability with respect to the strength reinforcement. This can be similarly applied to the reinforcing frame 120 of another drawing.

FIG. 14 is a sectional view of a vacuum adiabatic body illustrating a rear frame according to another embodiment. Referring to FIG. 14, the rear frame 121 is mounted on the inner surface of the first plate member 10. Other reinforcement frames 120 may be provided as well.

Specifically, in a case of the present embodiment, the rear frame 121 may be provided in a shape of a bent section in the same shape as the bent corner of the inner surface of the first plate member 10. The rear frame 121 supports both the rear surface part and the side surface part of the inner surface of the first plate member 10 so that the strength of each surface can be reinforced. In addition, the rear frame 121 can reinforce strength against bending and buckling of the vacuum adiabatic body with high rigidity.

The respective surfaces of the rear frame 121 may be integrally welded or mechanically fastened to respective surfaces of the corresponding first plate member 10. Since the rear frame 121 can be integrated with the mullion seating frame 130 and the mullion front frame 140, the stability of the overall strength reinforcing action can be enhanced. Since the rear frame is mounted on the outer surface of the vacuum space part 50, no problem such as interference occurs when the supporting unit 30 is installed. Therefore, microscopic change of the vacuum adiabatic body can be prevented.

Although the rear frame 121 is illustrated as an example in the drawing, other reinforcing frames 120 may be provided in the same sectional shape and may extend along corners at the same position of the vacuum adiabatic body. Other reinforcement frames can perform the same strength reinforcement action as the rear frame 121.

FIG. 15 is a sectional view of a vacuum adiabatic body illustrating a rear frame according to another embodiment. Referring to FIG. 15, the rear frame 121 is mounted on the outer surface of the first plate member 10. Other reinforcement frames 120 may be provided as well.

Specifically, in a case of the present embodiment, the rear frame 121 may be provided in a bent shape in section as the same shape as the bent corner of the outer surface of the first plate member 10. The rear frame 121 supports both the rear surface part and the side surface part of the outer surface of the first plate member 10 so that the strength of each surface can be reinforced. In addition, the rear frame 121 can reinforce strength against bending and buckling of the vacuum adiabatic body with high rigidity.

The respective surfaces of the rear frame 121 may be integrally welded or mechanically fastened to respective surfaces of the outer surfaces of the corresponding first plate member 10. Since the rear frame is mounted on the inner surface of the vacuum space part 50, there is no part exposed to the outside of the appliance, so there is no problem such as interference in the manufacturing process of the appliance.

Although the rear frame 121 is illustrated as an example in the drawing, the other reinforcing frames 120 are also provided in the same sectional shape, and the other reinforcing frames 120 and the vacuum adiabatic body can be integrated with each other by extending along the corners at the same position with respect to the vacuum adiabatic body. Other reinforcement frames can also perform the same strength reinforcement action as the rear frame 121.

FIG. 16 is a sectional view of a vacuum adiabatic body illustrating a rear frame according to another embodiment. Referring to FIG. 16, the rear frame 121 is mounted on the outer surface of the second plate member 20. Other reinforcement frames 120 may be provided as well.

Specifically, in a case of the present embodiment, the rear frame 121 may be provided in a shape of a bent section in the same shape as the bent corner of the outer surface of the second plate member 20. The rear frame 121 supports both the rear surface part and the side surface part of the outer surface of the second plate member 20 so that the strength of each surface can be reinforced. In addition, the rear frame 121 can reinforce strength against bending and buckling of the vacuum adiabatic body with high rigidity.

The respective surfaces of the rear frame 121 may be integrally welded or mechanically fastened to respective surfaces of the outer surfaces of the corresponding second plate member 20. The rear frame is mounted on the outer surface of the vacuum space part 50 so that it can be manufactured without complication in the manufacturing process and then fastened to the outer surface of the second plate member 20 in the last step of the vacuum adiabatic body. Accordingly, the manufacturing process can be simplified.

Although the rear frame 121 is illustrated as an example in the drawing, the other reinforcing frames 120 are also provided in the same sectional shape and can be integrated with each other by extending along the corners at the same position with respect to the vacuum adiabatic body. Other reinforcement frames can perform the same strength reinforcement action as the rear frame 121.

In a case of the present embodiment, it can be integrated with the mullion seating frame 130 and the mullion front frame 140 through the outside of the vacuum adiabatic body, specifically, through the opening of the main body 2. Accordingly, there is an advantage that the stability of the overall strength reinforcing action is enhanced.

Referring to FIGS. 14 to 16, the reinforcing frame 120 may be thicker than the plate member to reinforce the strength of the vacuum adiabatic body. The reinforcing frame 120 is extended to be long in one direction along the corner of the vacuum insulation body of the reinforcing frame 120. The reinforcing frame 120 can function as a beam to resist bending with respect to the extending direction of the reinforcing frame 120.

To this end, sectional length L of the reinforcing frame 120 is provided to be longer than the thickness W of the vacuum space part in order to obtain a rigidity when observing the section of the reinforcing frame. In other words, in the section of the reinforcing frame 120 illustrated in FIGS. 14 to 16, the sectional length L of the reinforcing frame 120 extending in any one direction is larger than the thickness W of the vacuum space part. Accordingly, it is possible to obtain a sufficient rigidity against the bending.

In addition, the sectional length of the reinforcing frame 120 may be smaller than the length of the reinforcing frame 120 in the extending direction. In other words, the sectional length of the reinforcing frame can be provided smaller than the entire length of the reinforcing frame 120 extending along the corner of the vacuum adiabatic body in FIGS. 14 to 16.

FIG. 17 is a view illustrating a heat exchange pipeline in a vacuum adiabatic body to which a reinforcing frame is installed. Referring to FIG. 17, in the refrigeration system, the refrigerant pipelines before and after the evaporator perform heat-exchange with each other in order to improve the thermal efficiency of the refrigeration cycle. The pipeline through which the refrigerant performs heat-exchange may be called a heat exchange pipeline 170. Since the heat exchange pipeline 170 occupies a space inside or outside of the refrigerator, the heat exchange pipeline 170 can be provided with a predetermined length in the inside of the vacuum adiabatic body, that is, in the inside of the vacuum space part 50.

Among the reinforcing frame 120, the rear frame 121 is provided in the path of the heat exchange pipeline 170 which is drawn in and out the machine chamber 8. Therefore, the heat exchange pipeline 170 must pass through the rear frame 121 while exiting the vacuum space part 50. The rear frame 121 is provided not only with a predetermined thickness but also with a predetermined area and length in order to reinforce the strength. Therefore, when the heat exchange pipeline 170 is in direct contact with the rear frame 121, heat exchange occurs between the heat exchange pipeline 170 and the rear frame 121 to generate heat loss.

In order to solve the above problem, in the embodiment, a part of the rear frame 121 may be removed from the portion where the heat exchange pipeline 70 passes. The portion of the rear frame 121 to be removed may be completely cut on the planar structure and the thickness of the rear frame 121 may be thinner than the other portions to be cut, and thus a part thereof may remove on the vertical structure. In both cases, the amount of heat transfer between the heat exchange pipeline 170 and the rear frame 121 is reduced, thereby reducing the heat loss.

FIG. 18 is an enlarged view of portion A in FIG. 17 in which a rear frame is cut. Referring to FIG. 18, it can check that the horizontal portion of the rear frame 121 is cut to form a rear frame cutout part (or cutout) 1211. Since the heat exchange pipeline 70 passes without contacting the rear frame 121, heat loss does not occur. It is also fully contemplated that a frame cutout part may be provided on another reinforcement frame 120 when the heat exchange pipeline 170 passes through another reinforcement frame 120.

The area provided with the rear frame cutout part 1211 may be applied a sealing scheme that is variously illustrated in FIG. 4 for sealing, and sealing may be performed by welding between the heat exchange pipeline 170 and the plate member. It is also easily understood that a frame cutout part may be further provided on the reinforcement frame 120 placed on the path through which various pipelines causing heat loss are passed in addition to the heat exchange pipeline 170.

FIG. 19 is a sectional perspective view of the vacuum adiabatic body illustrating the reinforcing frame according to another embodiment, illustrating a front surface part of the vacuum adiabatic body. Referring to FIG. 19, in the present embodiment, the vacuum space part 50 is provided with two spaced reinforcing frames, one of which is provided in a bent shape, and the other of which is provided in a straight shape in section. Accordingly configuration, it is possible to increase the strength of the vacuum adiabatic body and to prevent the interference between the two reinforcing members, thereby making it possible to obtain an advantage that the operation is simple at the time of manufacture.

A second front inner frame (or second frame) 1232 having a flat section may be provided on the outer surface of the first plate member 10 and a first front inner frame (or first frame) 1231 having a bent section may be provided on the inner surface of the second plate member 20. The position where the first front inner frame 1231 is bent is positioned inside the end part of the second plate member 20. Accordingly, when the conductive resistance sheet 60 is deformed into a curved surface by the vacuum pressure, the contact is prevented to prevent the loss of the cold air.

It is preferable that the second front inner frame 1232 and the first front inner frame 1231 are not allowed to contact and approach each other. Accordingly, the heat conduction and the thermal radiation between the reinforcing frames can be blocked, thereby preventing the loss of the cold air.

The reinforcing frame according to the present embodiment may be provided in the same form in the rear surface part and the side surface part of the vacuum adiabatic body as well as in the front surface part as illustrated and may be provided in connection with each other. In this case, it is important that the reinforcing frame fastened to each of the first and second plate members is prevented from coming into contact with and approaching the reinforcing frame of the other plate member, thereby preventing the loss of the cold air.

The first front inner frame 1231 or the second front inner frame 1232 may be provided alone. The first front inner frame 1231 is a bent type, and so as to reduce the conduction heat between the plate members, the length of the first front inner frame 1231 in the vertical direction extending to the plate member in the vertical direction may be provided to be smaller than the height of the third space.

FIG. 20 is a sectional perspective view of a vacuum adiabatic body illustrating a reinforcing frame according to another embodiment, illustrating a front surface part of the vacuum adiabatic body. Referring to FIG. 20, in the present embodiment, one reinforcing frame is provided inside the vacuum space part 50, and one reinforcing frame is provided outside the vacuum space part 50. At this time, also one of the reinforcing frames may be provided in a bent shape, and the other may be provided in a straight shape in section. Accordingly configuration, it is possible to more reliably prevent the interference between the two reinforcing members, while enhancing the strength of the vacuum adiabatic body, thereby achieving an advantage that the work is easy at the time of manufacture.

A front bent frame (or second frame) 1234 having a bent shape in section is provided on the inner surface of the first plate member 10, and a front straight frame (or first frame) 1233 has a straight shape in section and is provided on the inner surface of the second plate member 20. The bent position of the front bent frame 1234 is positioned outside the end part of the second plate member 20. Accordingly, the rigidity to resist the bending strength applied to the side of the main body of the refrigerator can be further increased. Since the front bent frame 1234 is placed outside the vacuum space part even when the conductive resistance sheet 60 is deformed to a curved surface, there is no possibility that the conductive resistance sheet 60 comes into contact with the front bent frame 1234.

The reinforcing frame according to the present embodiment may be provided in the same form in the rear surface part and the side surface part of the vacuum adiabatic body as well as in the front surface part as illustrated and may be provided in connection with each other. In this case, since the reinforcing frame fastened to each of the first and second plate members is not initially in contact with the reinforcing frame of the other plate member, heat loss due to contact and approach between the reinforcing frames does not occur.

FIG. 21 is a sectional view illustrating a vacuum adiabatic body illustrating a reinforcing frame according to another embodiment and illustrating a front surface part of a vacuum adiabatic body. Referring to FIG. 21, in the present embodiment, one reinforcing frame is provided in the vacuum space part 50, and one reinforcing frame is provided inside the refrigerator of the outside of the vacuum space part 50. At this time, one reinforcing frame may be provided in a bent shape in section, and the other reinforcing frame may be provided in a straight shape in section. Accordingly configuration, it is possible to increase the strength of the vacuum adiabatic body and to prevent the interference between the two reinforcing members, thereby making it possible to obtain an advantage that the operation is simple at the time of manufacture.

A front straight frame 1233 having a flat section can be provided on the outer surface of the first plate member 10 and a front bent frame 1234 having a bent section can be provided on the inner surface of the first plate member 10. As in the embodiment illustrated in FIG. 20, the bent position of the front bent frame 1234 is positioned outside the end part of the first plate member 10. The action and effect, accordingly, are same.

The reinforcing frame according to the present embodiment may be provided in the same form in the rear surface part and the side surface part of the vacuum adiabatic body as well as in the front surface part as illustrated and may be provided in connection with each other. In a case of the present embodiment, only the first plate member 10 is provided with a reinforcing frame, and the second plate member 20 may not be provided with a reinforcing plate. Even in this case, the overall structural strength of the vacuum adiabatic body can be supported by the supporting action by the supporting unit 30. In a case of the present embodiment, since the parts necessary for the operation of the appliance such as the refrigerator to which the vacuum adiabatic body is applied can be supported by the front bent frame 1234, the reinforcing frame has two functions of strength reinforcement and part support can be performed together.

FIG. 22 is a sectional view illustrating a vacuum adiabatic body illustrating a reinforcing frame according to another embodiment and illustrating a front surface part of the vacuum adiabatic body. Referring to FIG. 22, the present embodiment is characterized in that the front straight frame 1233 is installed on the outer surface of the second plate member 1233, not on the inner surface thereof. The present embodiment can be preferably applied to a case where the curvature deformation of the conductive resistance sheet 60 due to the application of the vacuum pressure is large, a case where the supporting unit 30 needs to extend to the end part of the vacuum adiabatic body or a case where the interference by the reinforcing frame is avoided.

The front straight frame 1233 of the present embodiment can be proposed as a straight type without interference even if the front straight frame is placed on the outer surface of the second plate member 20. There is an advantage that the strength can be directly reinforced at the portion where the greatest bending load is generated, that is, at the outermost peripheral portion of the main body-side vacuum adiabatic body opening. Therefore, the force to resist the deformation of the opening of the refrigerator as described in FIG. 8 can be increased.

FIG. 23 and FIG. 24 are perspective views illustrating any one vertex portion of the vacuum adiabatic body, wherein FIG. 23 is a view before the door hinge is installed, and FIG. 24 is a view illustrating a state where the door hinge is installed. In a case of a refrigerator, a door hinge is provided at the connection portion so that the door-side vacuum adiabatic body can be fastened to the main body-side vacuum adiabatic body in a rotatable state. The door hinge has a predetermined strength by itself. The door hinge is preferably supported by the reinforcing frame 120 to prevent the door from being sagged by the door's own weight in a state where the door is fastened and to prevent the main body from being twisted. A plate member 20 may be interposed at a boundary between the door hinge and the reinforcing frame 120.

Referring to FIG. 23, so as to fasten the door hinge 263, a door fastener 260 is provided on the main body-side vacuum adiabatic body. Three door fasteners 260 may be provided. The door fastener 260 can be directly or indirectly fixed to the second plate member 20, the reinforcing member 120, and/or a separate additional reinforcing member (for example, additional plate which is further provided to outer surface of second plate member). Here, direct fixing may be referred to as one by a fusion method such as welding, and indirect fixing may be referred to as a fastening method using an auxiliary fastening tool or the like instead of the method such as fusion or the like.

Since the door fastener 260 is required to have a high supporting strength, the door fastener 260 can be in contact with and fastened to the second plate member 20. To this end, the sealing frame 200 may be cut. The sealing frame 200 to be cut may have a cut surface 261 and the second plate member 20 may have a door fastener seating surface 262 to which the door fastener 260 is fastened. Accordingly, the door fastener seating surface 262 can be exposed to the outside by the cut of the sealing frame 200, and an additional plate member can be further interposed in the door fastening part seating surface 262.

The end part of the sealing frame 200 may not be entirely removed, but a portion of the sealing frame 200 may be removed only at a portion where the door fastener 260 is provided. However, it is more preferable to remove all the end parts of the sealing frame 200 in order to facilitate the manufacturing and to firmly support and fasten the door hinge 263 to the side of the vacuum adiabatic body.

Meanwhile, as described above, the reinforcing frame 120 is in surface contact with each of the two surfaces forming the corners of the refrigerator body to reinforce the strength. The reinforcing frame 120 may be in contact with at least one side of the first plate member 10 and the second plate member 10 on which the sealing frame 200 is seated. Accordingly, the door hinge 263 can be supported by the reinforcing frame 120.

FIG. 25 and FIG. 26 are diagrams for explaining the door hinge provided in the mullion portion. FIG. 25 illustrates a state where the door hinge is installed and FIG. 26 illustrates the state before the door hinge is installed. In recent years, an upper-refrigerating and lower-freezing type of refrigerator have been spotlighted. In the upper-refrigerating and lower-freezing type of refrigerator, the door hinge is installed not only on the upper and lower ends of the vacuum adiabatic body but also on the mullion portions.

Referring to FIGS. 25 and 26, in order to fasten the door hinge to the mullion portion, there is provided a seating recess 1400 in which the mullion front frame 140 is provided with a predetermined depth cut off, the hinge fastening groove 1401 can be machined in the seating recess. The sealing frame 200 may be provided with a seating cutout part (or cutouts) 264.

A door hinge 263 may be seated on the seating recess 1400 and the seating cutout part 264. With this structure, the door hinge 263 can be placed in the correct position. In a state where the door hinge 263 is seated, a fastener such as a screw is fitted into the hinge fastening groove 1401 so that the door hinge 263 can be fastened. At this time, the fastener may extend to the reinforcing frame to strengthen the fastening force. Of course, a welding method or the like may be applied instead of the fastening method using the fastener.

FIG. 27 is a perspective view of the mullion support frame. Referring to FIG. 27, a mullion seating frame 130 may be provided along the peripheral portion on which the mullion 300 is placed so that the mullion 300 can be positioned in the correct position of the interior of the vacuum adiabatic body. At least a portion of a section of the mullion seating frame 130 is provided in a bent shape so that the mullion 300 placed in a predetermined position can be prevented from moving. The section of all the portions of the mullion seating frame 130 is provided in a bent shape so that the rigidity becomes larger and can withstand a greater bending stress and buckling stress.

The mullion seating frame 130 may be fastened to the inner surface of the first plate member 10 by a welding method or the like and, in some cases, may be also fastened to the reinforcing frame 120 to strengthen the fastening force thereof. In the drawings, the mullion seating frames 130 are provided on all the four corner portions of the inner surface of the vacuum adiabatic body, and it is preferable that the mullion seating frames are all provided for strength reinforcement. However, any one of the mullion seating frames may not be provided.

The mullion seating frame 130 can prevent the deformation of the opening side of the vacuum adiabatic body as illustrated in FIG. 11, in particular, the deformation in the extending direction. In addition to the mullion seating frame 130, the mullion front frame 140 can prevent deformation of the opening side of the vacuum adiabatic body, particularly deformation in the reduced direction. Of course, in a case where the mullion front frame 140 is fastened to the mullion seating frame 130, both expansion and contraction as deformation of the opening side of the vacuum adiabatic body may correspond.

Meanwhile, the auxiliary frame 1301 may be further installed along the peripheral portion of the opening side of the vacuum adiabatic body. The auxiliary frame 1301 may be installed on the inner surface side of the first plate member 10 so as to be integral with the mullion seating frame 130. In a case of FIGS. 14, 20, 21, and 22 in which the reinforcing frame 120 is provided on the inner surface side of the first plate member 10, each corresponding frame serves as the auxiliary frame 1301 and a separate auxiliary frame 1301 may not be needed.

The auxiliary frame 1301 has an advantage that the auxiliary frame can more firmly resist deformation of the opening side of the vacuum adiabatic body. In particular, the auxiliary frame 1301 may be provided on the mullion seating frame 130 and the mullion front frame 140 to increase the strength of each member.

FIG. 28 is a cutout perspective view for explaining the action of the mullion seating frame, FIG. 29 is an enlarged sectional view of portion B of FIG. 28, and FIG. 30 is an enlarged sectional view of portion C of FIG. 28. Referring to FIGS. 28 to 30, the mullion seating frame 130 may be provided in a bent sectional shape.

Portions of the mullion seating frame 130 that are in contact with the first plate member 10 are fastened in a welding method or the like and the other portions thereof can serve as a portion supporting the mullion 300. Portions of the mullion seating frame 130 that are not in contact with the first plate member 10, that is, the mullion seating frame 130 which is placed on the opened portion of the vacuum adiabatic body, can act as elements which supports not only the lower surface of the mullion and but also restricts forward extraction of the mullion.

The operator can complete the assembly of the mullion 300 only by simply placing the mullion 300 in alignment with the mullion seating frame 130 at the production site. The mullion front frame 140 is not illustrated in the drawing, but may be separately provided, and the mullion seating frame 130 and mullion front frame 140 may be fastened to each other.

The mullion 300 may serve as the reinforcing frame. In this case, a separate frame can be provided on the outer portion of the mullion in the mullion. In particular, in a case where the main body is long in the longitudinal direction, the action of the reinforcing frame due to the mullion can be more significantly exposed.

FIG. 31 is a sectional view illustrating a mullion seating frame according to another embodiment. Referring to FIG. 31, the present embodiment discloses a mullion seating frame 130 that is capable of blocking heat transfer between a refrigerating chamber and a freezing chamber that are divided in the upper-refrigerating and lower-freezing refrigerator by the mullion.

The rear mullion seating frame 1310 placed on the rear surface of the mullion seating frames differs from the embodiment illustrated in FIG. 28 in the bent position. Specifically, a support surface 1311 is provided which is bent in the inside direction of the refrigerator at the upper end of the fixing surface 1312 fixed to the inner surface of the first plate member 10. Therefore, it is possible to prevent the cool air in the freezing chamber from being conducted to the gap where the mullion 300 is installed through the rear mullion seating frame 1310. This can also be applied to other mullion seating frame 130 as well.

The mullion 300 has an adiabatic member 3001 such as polyurethane provided therein, and an outer portion surrounding the adiabatic member 3001 may be provided as a case member 3002 provided with acrylonitrile butadiene styrene (ABS) resin as an example. The case member 3002 is divided into upper and lower portions so that the upper and lower portions of the case member 3002 can be fastened to each other in a state where the adiabatic member 3001 is inserted. A mullion cold air flow path 310 may be provided so that the cold air can selectively flow the freezing chamber and the freezing chamber through the mullion 300 alternately. As can be seen, the mullions 300 are fitted to one another in a product separate from the first plate member 10. Therefore, a sealing member (or seal) 3004 for sealing the contact part between the mullion 300 and the inner surface of the first plate member 10 may be further provided. The sealing member 3004 may be provided on both the rear surface and the side surfaces, that is, three surfaces of the vacuum adiabatic body.

The front surface part of the mullion 300 can be supported by the mullion front frame 140. The lower end of the mullion front frame 140 is bent, the bent portion can support the mullion 300, an end part of the case member 3002 is engaged with and supported by the upper end of the mullion front frame 140. The mullion front frame 140 may be provided as a member detachable from the plate member and the reinforcing frame. In this case, the mullion 300 may be separated from the installation position.

The mullion front frame 140 may be made of a metal material and heat exchange may occur between the refrigerating chamber and the freezing chamber. In order to solve this problem, it is possible to provide the front seating frames 133 and 132 individually in the refrigerating chamber and the freezing chamber in place of the mullion front frame 140. Specifically, a first front mullion seating frame 132 supporting a lower side of a front surface part of the mullion 300 and a second front mullion seating frame 133 supporting an upper side of a front surface part of the mullion 300 may be provided. The two members may be made of a metal, and the right and left sides of the opening may be connected to each other to prevent the opening part of the vacuum adiabatic body from shrinking. It is possible to provide both the mullion front frame 140 and the mullion seating frames 132 and 133 in some cases. In this case, it is possible to obtain an effect that the strength reinforcement to the opening portion of the vacuum adiabatic body is further enhanced.

Meanwhile, the first plate member 10 of the vacuum adiabatic body is made of a metal. In this case, the cold air in the freezing chamber can be moved to the refrigerating chamber along the first plate member 10. The position where the heat transfer between the refrigerating chamber and the freezing chamber is greatest is the position on the first plate member 10 corresponding to the mullion 300. A conductive resistance sheet 60 may be provided at the position of the first plate member 10 corresponding to the mullion 300 in order to solve the problem of the heat conduction.

FIG. 32 is an enlarged view illustrating portion D in FIG. 31. Referring to FIG. 32, the first plate member 10 aligned with the mullion in the front and rear direction is provided with a conductive resistance sheet 60. The conductive resistance sheet may be provided in a path through which the cold air in the freezing chamber is transferred to the refrigerating chamber to block cold air that is conducted. The conductive resistance sheet 60 may be provided in the same material, construction, and manner as the other conductive resistance sheets used on the main body side.

According to aspects of the present disclosure, it is possible to prevent bending and buckling caused by the insufficient strength of a vacuum adiabatic body in an appliance using a vacuum adiabatic body, thereby contributing to the commercialization of the appliance. According to aspects of the present disclosure, in the case of a refrigerator, heat exchange between the refrigerating chamber and the freezing chamber is blocked, so that when the refrigerator is provided using a single vacuum adiabatic body, the loss of the cold air can be prevented and the energy consumption efficiency can be increased.

An aspect of the present disclosure is to reinforce the structural strength against various load conditions to prevent breakage of the vacuum adiabatic body. Another aspect of the present disclosure is to reinforce the structural strength of a refrigerator without adversely affecting the internal volume of the refrigerator which can be obtained by application to a vacuum adiabatic body. Another aspect of the present disclosure is to enable a worker to conveniently produce a refrigerator using a vacuum adiabatic body. Another aspect of the present disclosure is to manufacture a refrigerator which increases energy consumption efficiency.

A vacuum adiabatic body according to the present disclosure is provided with at least one reinforcing frame which is installed along the corner of at least one of a first plate member and a second plate member constituting the vacuum adiabatic body and is provided as one body for reinforcing the strength. According to the present disclosure, it is possible to reinforce the strength of the three-dimensional structure which is insufficient only by the plate member, so that the vacuum adiabatic body can stably support heavier products.

The reinforcing frame is provided along all corners of at least one of the first plate member and the second plate member to support the overall strength of the three-dimensional structure. The reinforcing frame includes a bent frame whose section is a bent type so that the reinforcing frame can stably resist bending stress.

The bent frame is bent at the opposite side of the conductive resistance sheet so that contact thermal conduction between the bent frame and the conductive resistance sheet due to excessive deformation of the conductive resistance sheet can be prevented. The reinforcing frame is welded to the plate member so that the members are integrated with each other, thereby enhancing the strength reinforcing action.

The reinforcing frame may further include a straight frame which has a straight section so that the strength of the three-dimensional structure can be reinforced even at narrow gaps. The reinforcing frame is provided with a frame cutout part which is partially cut so that even though there is no overall strength reduction, the frame cutout part can correspond to a pipeline through which a part is passed and is drawn in and out.

By allowing at least one of the reinforcing frames to be placed in a vacuum space part, the narrow space part can be used more efficiently. The vacuum adiabatic body further includes a front frame which has an opening which is open to the outer space and prevents deformation of the opening across the opening, thereby further reinforcing the opening portion which is vulnerable to deformation in the three-dimensional structure.

A refrigerator according to the present disclosure includes: a main body which has an opening with respect to an accommodation space of a product and is provided as a vacuum adiabatic body; at least one reinforcing frame which is provided along a corner of the main body so as to reinforce the strength of the main body; and a front frame which prevents deformation of the opening across the opening. Accordingly, strength reinforcement with respect to the opening and strength reinforcement of the three-dimensional structure can be performed at the same time, so that it is possible to sufficiently reinforce the weak strength in the refrigerator to which the vacuum adiabatic body is applied.

The refrigerator further includes a mullion which divides the accommodation space of the product into a refrigerating chamber and a freezing chamber; and a mullion seating frame which is provided on an inner surface of the main body to support the mullion, thereby dividing spaces having different temperature into separate products different from the vacuum adiabatic body. The mullion seating frame and the front frame are provided as one body, so that deformation of the opening can be stably prevented.

The mullion seating frame is provided in a bent shape in section and can fix the position of the mullion. Accordingly, the work is facilitated, the mullion is easily placed, and the stability of the position of the seated mullion can be improved. A sealing member is provided between the mullion and the inner surface of the main body, thereby preventing heat exchange in a space defined even though the sealing member is provided as a separate member.

The front frame is provided to be spaced apart from the refrigerating chamber and the freezing chamber, respectively, thereby preventing heat loss due to heat conduction of the member itself. Since the front frame is provided with a seating recess in which the door hinge is seated, a necessary member such as a door can be fastened without waste of space.

The vacuum adiabatic body includes a conductive resistance sheet which reduces a heat transfer amount between the first plate member and the second plate member and another conductive resistance sheet for the first plate member corresponding to the mullion, so that it is possible to prevent heat loss due to heat conduction between the divided spaces by blocking the heat conduction along the plate member forming a space inside the refrigerator in the mullion. The reinforcing frame is provided to at least one of the vacuum space and the space outside the refrigerator along all the corners of the main body so as to reinforce the strength of the vacuum insulation.

The refrigerator includes a main body which has an opening with respect to an accommodation space of a product and is provided as a vacuum adiabatic body; at least one reinforcing frame which is provided along a corner of the main body so as to reinforce the strength of the main body; and a mullion which is supported on the inner surface of the main body and divides the accommodation space into a refrigerating chamber and a freezing chamber, in which the mullion includes an adiabatic member; a case member which surrounds the adiabatic member; and a mullion cold air flow path which selectively communicates the refrigerating chamber and the freezing chamber. Accordingly, the internal space can be divided using a single vacuum adiabatic body so that both the refrigerating and freezing functions can be realized.

The refrigerator may further include a mullion seating member which supports the mullion, and the mullion may be engaged with the mullion seating member to fix the installation position. Accordingly, the mullion can be stably positioned in the determined position.

According to an aspect of the present disclosure, it is possible to maintain the shape of the vacuum adiabatic body firmly and to prevent breakage of the refrigerator. According to an aspect of the present disclosure, it is possible to increase the strength of the vacuum adiabatic body while increasing the space inside the refrigerator. According to an aspect of the present disclosure, the manufacture of the refrigerator can be facilitated and the productivity can be improved.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A vacuum adiabatic body comprising:
   a first plate which defines at least a portion of a wall for a first space;
   a second plate which defines at least a portion of a wall for a second space which has a temperature different from that of the first space;
   a sheet which seals between the first plate and the second plate so as to provide a third space which has a temperature between a temperature of the first space and a temperature of the second space and is in a vacuum state;
   a support provided in the third space to maintain a gap in the third space; and
   at least one reinforcing frame which is installed along at least one corner defined by the first plate and the second plate so as to reinforce strength of the vacuum adiabatic body.

2. The vacuum adiabatic body according to claim 1, wherein the reinforcing frame is provided along all the corners of the vacuum adiabatic body defined by at least one of the first plate or the second plate.

3. The vacuum adiabatic body according to claim 1, wherein the reinforcing frame includes a first frame having two walls that intersect at an angle that is not a straight angle.

4. The vacuum adiabatic body according to claim 3, further comprising:
   a sheet which extends between the first plate and the second plate,
   wherein a first wall, of the two walls of the first frame, extends along one of the first plate or the second plate and includes a first edge that intersect a second wall of the two walls and a second edge that is opposite to the first edge and is closer to the sheet than the first edge.

5. The vacuum adiabatic body according to claim 3, wherein the reinforcing frame is welded to at least one of the first plate or the second plate.

6. The vacuum adiabatic body according to claim 3, wherein the reinforcing frame further includes a second frame that is separated from the first frame and has a section with a planar shape.

7. The vacuum adiabatic body according to claim 1, wherein a frame cutout is provided on the reinforcing frame.

8. The vacuum adiabatic body according to claim 1, wherein at least a portion of the reinforcing frame is placed in the third space between the first plate and the second plate.

9. The vacuum adiabatic body according to claim 1, further comprising:
   an opening; and
   a front frame which is positioned at the opening and is coupled to at least one of the first plate or the second plate to prevent deformation of the vacuum adiabatic body at the opening.

10. A refrigerator comprising:
    a vacuum adiabatic body which includes
      a first plate which defines at least a portion of a wall for a first space,
      a second plate which defines at least a portion of a wall for a second space which has a temperature different from that of the first space, and
      a sheet which seals the first plate and the second plate so as to provide a third space which has a temperature between a temperature of the first space and a temperature of the second space and is in a vacuum state;
    a door which opens and closes an opening of the vacuum adiabatic body;
    a first reinforcing frame which extends along a corner formed on a vertical edge of the vacuum adiabatic body that is positioned opposite to the opening and is installed on at least one of the first plate or the second plate; and
    a second reinforcing frame which extends along at least a portion of the opening and is installed on at least one of the first plate or the second plate.

11. The refrigerator according to claim 10, further comprising:
    a third reinforcing frame which is provided to connect the first reinforcing frame and the second reinforcing frame to each other.

12. The refrigerator according to claim 11, further comprising:
    a fourth reinforcing frame which extends to traverse the opening of the vacuum adiabatic body.

13. The refrigerator according to claim 12, further comprising:
    a partition which is positioned in a storage space defined by the vacuum adiabatic body to divide the storage space into a plurality of chambers,
    wherein the fourth frame is positioned at an outer surface of the partition.

14. The refrigerator according to claim 13,
    wherein the plurality of chambers include a refrigerating chamber and a freezing chamber, and
    wherein the partition includes
      an adiabatic member;
      a case which surrounds the adiabatic member; and
      a cold air flow path which selectively communicates the refrigerating chamber and the freezing chamber with each other.

15. The refrigerator according to claim 13,
    wherein a conductive resistance sheet is provided at a gap in the first plate formed to face a surface of the partition.

16. A refrigerator comprising:
    a main body having a first plate and a second plate, a space between the first plate and the second plate being in a vacuum state;
    a door which is moved to close at least a portion of an opening of the main body;
    a gasket which is installed on the door or the main body to provide a seal between the door and the main body when the door is positioned to close the opening;
    a sealing frame which is positioned to cover ends of at least a one of first plate or the second plate at the opening and to contact the gasket when the door is positioned to close the opening;
    a reinforcing frame configured to prevent deformation of the main body; and
    a door hinge which connects the main body and the door,
    wherein the reinforcing frame is in surface contact with respective surfaces forming corners of the main body and is in surface contact with an end region of at least one of the first plate or the second plate on which the sealing frame is seated, and wherein the door hinge is coupled to the door and the reinforcing frame.

17. The refrigerator according to claim 16, wherein the reinforcing frame extends a first length from one of the corners and along one of the first plate or the second plate, the reinforcing frame extends a second length along the corner, and the first length is greater than a width of the space in a direction between the first plate and the second plate and is less than the second length.

18. The refrigerator according to claim 16, wherein the reinforcing frame includes a plate that is positioned in the space between the first plate and the second plate, and a length of the plate of the reinforcing frame in a direction between the first plate and the second plate is less than a width of the space in the direction between the first plate and the second plate.

19. The refrigerator according to claim 16, wherein a thickness of a plate included in the reinforcing frame is greater than a thickness of the first plate or the second plate.

20. The refrigerator according to claim 16, wherein the refrigerator further comprises:
- a partition which is provided in the main body to partition the storage space into two or more chambers; and
- a partition frame which has one or more plates to couple the partition to the reinforcing frame.

* * * * *